(12) United States Patent
Ravi et al.

(10) Patent No.: US 10,846,618 B2
(45) Date of Patent: Nov. 24, 2020

(54) SMART REPLIES USING AN ON-DEVICE MODEL

(71) Applicant: Google Inc., Mountain View, CA (US)

(72) Inventors: Sujith Ravi, Santa Clara, CA (US);
Thomas Matthew Rudick, Cambridge, MA (US); Nathan Dickerson Beach, Somerville, MA (US); John Patrick McGregor, Jr., Menlo Park, CA (US);
Mirko Ranieri, Cambridge, MA (US)

(73) Assignee: Google LLC, Mountain View, CA (US)

(*) Notice: Subject to any disclaimer, the term of this patent is extended or adjusted under 35 U.S.C. 154(b) by 695 days.

(21) Appl. No.: 15/686,954

(22) Filed: Aug. 25, 2017

(65) Prior Publication Data
US 2018/0089588 A1 Mar. 29, 2018

Related U.S. Application Data

(60) Provisional application No. 62/399,002, filed on Sep. 23, 2016.

(51) Int. Cl.
*G06N 20/00* (2019.01)
*G06N 5/04* (2006.01)
(Continued)

(52) U.S. Cl.
CPC .............. *G06N 20/00* (2019.01); *G06F 7/08* (2013.01); *G06N 5/04* (2013.01); *G06Q 10/10* (2013.01); *H04L 51/02* (2013.01)

(58) Field of Classification Search
CPC .......... G06N 20/00; G06N 5/04; H04L 51/02; G06Q 10/10
See application file for complete search history.

(56) References Cited

U.S. PATENT DOCUMENTS

| 5,528,745 A | 6/1996 | King et al. |
| 6,816,885 B1 | 11/2004 | Raghunandan et al. |

(Continued)

FOREIGN PATENT DOCUMENTS

| CN | 1946075 A | 4/2007 |
| CN | 1975857 A | 6/2007 |

(Continued)

OTHER PUBLICATIONS

Sordoni, Alessandro, et al. "A neural network approach to context-sensitive generation of conversational responses." arXiv preprint arXiv:1506.06714 (2015). (Year: 2015).*

(Continued)

*Primary Examiner* — Benjamin P Geib
(74) *Attorney, Agent, or Firm* — Shumaker & Sieffert, P.A.

(57) ABSTRACT

A computing device may receive a communication sent from an external computing device. At least one processor of the computing device may determine, using an on-device machine-trained model and based at least in part on the communication, one or more candidate responses to the communication. The at least one processor may receive an indication of a user input that selects a candidate response from the one or more candidate responses. Responsive to receiving the indication of the user input that selects the candidate response, the at least one processor may send the candidate response to the external computing device.

15 Claims, 6 Drawing Sheets

(51) Int. Cl.
  *G06Q 10/10* (2012.01)
  *H04L 12/58* (2006.01)
  *G06F 7/08* (2006.01)

(56) References Cited

U.S. PATENT DOCUMENTS

| | | |
|---|---|---|
| 7,209,951 B2 | 4/2007 | Goldberg |
| 7,580,719 B2 | 8/2009 | Karmarkar |
| 7,660,855 B2 | 2/2010 | Arning et al. |
| 8,122,096 B2 | 2/2012 | Kussmaul et al. |
| 8,200,691 B2 | 6/2012 | Xu et al. |
| 8,306,511 B2 | 11/2012 | Ling et al. |
| 8,385,975 B2 | 2/2013 | Forutanpour et al. |
| 8,423,577 B1 | 4/2013 | Lee et al. |
| 8,554,281 B2 | 10/2013 | Scott et al. |
| 8,996,639 B1 | 3/2015 | Faaborg et al. |
| 9,148,750 B2 | 9/2015 | Murakami |
| 9,213,941 B2 | 12/2015 | Petersen |
| 9,294,890 B1 | 3/2016 | Boutcher et al. |
| 9,736,268 B1 | 8/2017 | Tsay et al. |
| 10,250,541 B2 | 4/2019 | Beach et al. |
| 2002/0059164 A1 | 5/2002 | Shtivelman |
| 2005/0105712 A1 | 5/2005 | Williams et al. |
| 2005/0108345 A1 | 5/2005 | Suzuki |
| 2005/0135681 A1 | 6/2005 | Schirmer |
| 2006/0075035 A1 | 4/2006 | Tripp et al. |
| 2006/0190830 A1 | 8/2006 | Gerstl et al. |
| 2006/0265453 A1 | 11/2006 | Kaminsky et al. |
| 2007/0094008 A1 | 4/2007 | Huang et al. |
| 2009/0106695 A1 | 4/2009 | Perry et al. |
| 2009/0254624 A1 | 10/2009 | Baudin et al. |
| 2009/0282114 A1 | 11/2009 | Feng et al. |
| 2012/0245944 A1 | 9/2012 | Gruber et al. |
| 2013/0073662 A1 | 3/2013 | Meunier et al. |
| 2013/0304677 A1 | 11/2013 | Gupta et al. |
| 2013/0346347 A1 | 12/2013 | Patterson et al. |
| 2014/0052680 A1 | 2/2014 | Nitz et al. |
| 2014/0088954 A1 | 3/2014 | Shirzadi et al. |
| 2014/0161356 A1 | 6/2014 | Tesch et al. |
| 2015/0033143 A1 | 1/2015 | Lee |
| 2015/0089007 A1 | 3/2015 | Amoroso et al. |
| 2015/0195220 A1 | 7/2015 | Hawker et al. |
| 2015/0302301 A1 | 10/2015 | Petersen |
| 2015/0363215 A1 | 12/2015 | Versteeg et al. |
| 2015/0370693 A1 | 12/2015 | Voccio et al. |
| 2015/0373201 A1 | 12/2015 | Landers et al. |
| 2015/0379130 A1 | 12/2015 | Harik et al. |
| 2016/0162791 A1 | 6/2016 | Petersen |
| 2016/0359771 A1* | 12/2016 | Sridhar ............ H04M 1/72552 |
| 2017/0180294 A1 | 6/2017 | Milligan et al. |
| 2017/0222961 A1 | 8/2017 | Beach et al. |
| 2018/0053101 A1* | 2/2018 | Cudworth ............... H04L 67/10 |
| 2018/0089588 A1 | 3/2018 | Ravi et al. |
| 2019/0199656 A1 | 6/2019 | Foerster et al. |
| 2019/0199668 A1 | 6/2019 | Beach et al. |

FOREIGN PATENT DOCUMENTS

| | | |
|---|---|---|
| CN | 101287040 A | 10/2008 |
| CN | 102707967 A | 10/2012 |
| CN | 105247902 A | 1/2016 |
| EP | 2393046 A1 | 12/2011 |
| JP | 2000339314 A | 12/2000 |
| JP | 2001056792 A | 2/2001 |
| JP | 2008512789 A | 4/2008 |
| JP | 2013254420 A | 12/2013 |
| JP | 2014134903 A | 7/2014 |

OTHER PUBLICATIONS

Ravi et al., "Large Scale Distributed Semi-Supervised Learning Using Streaming Approximation," May 16, 2016, 10 pp.
Hedge et al., "Efficient Machine Learning Using Random Projections," Department of Electrical and Computer Engineering, Rice University—Department of Electrical Engineering and Computer Science, The University of Michigan at Ann Arbor, Dec. 29, 2007, 2 pp.
U.S. Appl. No. 16/714,130, filed Dec. 13, 2019, by Morten Just Petersen.
International Search Report and Written Opinion of International Application No. PCT/US2017/052958, dated Nov. 16, 2017, 14 pp.
Response to Written Opinion dated Nov. 16, 2017, from International Application No. PCT/US2017/052958, dated Jun. 6, 2018, 20 pp.
Combined Search and Examination Report from counterpart United Kingdom Application No. 1715314.9, dated Mar. 9, 2018, 8 pp.
Response to Combined Search and Examination Report dated Mar. 9, 2018, from counterpart United Kingdom Application No. 1715314.9, filed Sep. 17, 2018, 21 pp.
International Preliminary Report on Patentability from International Application No. PCT/US2017/052958, dated Apr. 4, 2019, 9 pp.
Bell, "Gmail can use Google's AI to write replies for you", May 17, 2017. Mashable. Retrieved from the Internet: <http://mashable.com/2017/05/17/gmail-smart-replies/#5Xpn25v8YOqK> 6 pp.
Examination Report from counterpart United Kingdom Application No. 1715314.9, dated Aug. 6, 2019, 5 pp.
The Notification of Rejection, and translation thereof, from counterpart Japanese Application No. 2019-515964, dated Aug. 20, 2020, 8 pp.
Notice of Office Action, and translation thereof, from counterpart Korean Application No. 10-2019-7011706, dated Jun. 19, 2020, 10 pp.
Suzuyama et al, "Call Center DB Building/Searching and Their Application to a Support System for Composing the Answers to Questions," Informaion Processing Society of Japan, vol. 2007, No. 35., Mar. 28, 2007, pp. 29-34.

* cited by examiner

SMART REPLIES USING AN ON-DEVICE MODEL

RELATED APPLICATION

This application claims the benefit of U.S. Provisional Patent Application No. 62/399,002, filed Sep. 23, 2016, the entire content of which is hereby incorporated by reference.

BACKGROUND

A computing device may enable a user of the device to respond to received communications (e.g., a received message) sent by users of other computing devices. Such a computing device may provide one or more stock responses, stored by the computing device, which a user may choose from when composing a response to the received communication. In response to receiving an indication of user input that selects a stock response, the computing device may send the selected stock response from the computing device to another computing device of a different user that sent the communication.

SUMMARY

Aspects of the present disclosure are directed to providing candidate responses to reply to a received communication based on an on-device machine-trained model. That is, according to techniques of the present disclosure, a computing device may receive a communication from a remote computing device. The computing device may determine one or more candidate responses that are relevant to a received communication based on inputting the received communication into an on-device machine-trained model, and to output the one or more candidate responses. In response to receiving an indication of user input that selects one of the one or more candidate responses, the computing device may send the selected candidate response to the remote computing device to respond to the received communication.

In one aspect, the disclosure is directed to a method. The method includes receiving, by at least one processor of a computing device, a communication sent from an external computing device. The method further includes determining, by the at least one processor using an on-device machine-trained model and based at least in part on the communication, one or more candidate responses to the communication. The method further includes receiving, by the at least one processor, an indication of a user input that selects a candidate response from the one or more candidate responses. The method further includes responsive to receiving the indication of the user input that selects the candidate response, sending, by the at least one processor, the candidate response to the external computing device.

In another aspect, the disclosure is directed to a computing device. The computing device includes a memory configured to store an on-device machine-trained model. The computing device further includes at least one processor operably coupled to the memory and configured to: receive a communication sent from an external computing device; determine, using the on-device machine-trained model and based at least in part on the communication, one or more candidate responses to the communication; receive an indication of a user input that selects a candidate response from the one or more candidate responses; and responsive to receiving the indication of the user input that selects the candidate response, send the candidate response to the external computing device.

In another aspect, the disclosure is directed to a computer-readable storage medium encoded with instructions that, when executed, cause at least one processor of a computing device to: receive a communication sent from an external computing device; determine, using an on-device machine-trained model and based at least in part on the communication, one or more candidate responses to the communication; receive an indication of a user input that selects a candidate response from the one or more candidate responses; and responsive to receiving the indication of the user input that selects the candidate response, send the candidate response to the external computing device.

The details of one or more examples are set forth in the accompanying drawings and the description below. Other features, objects, and advantages will be apparent from the description and drawings, and from the claims.

DETAILED DESCRIPTION

Figure 1:
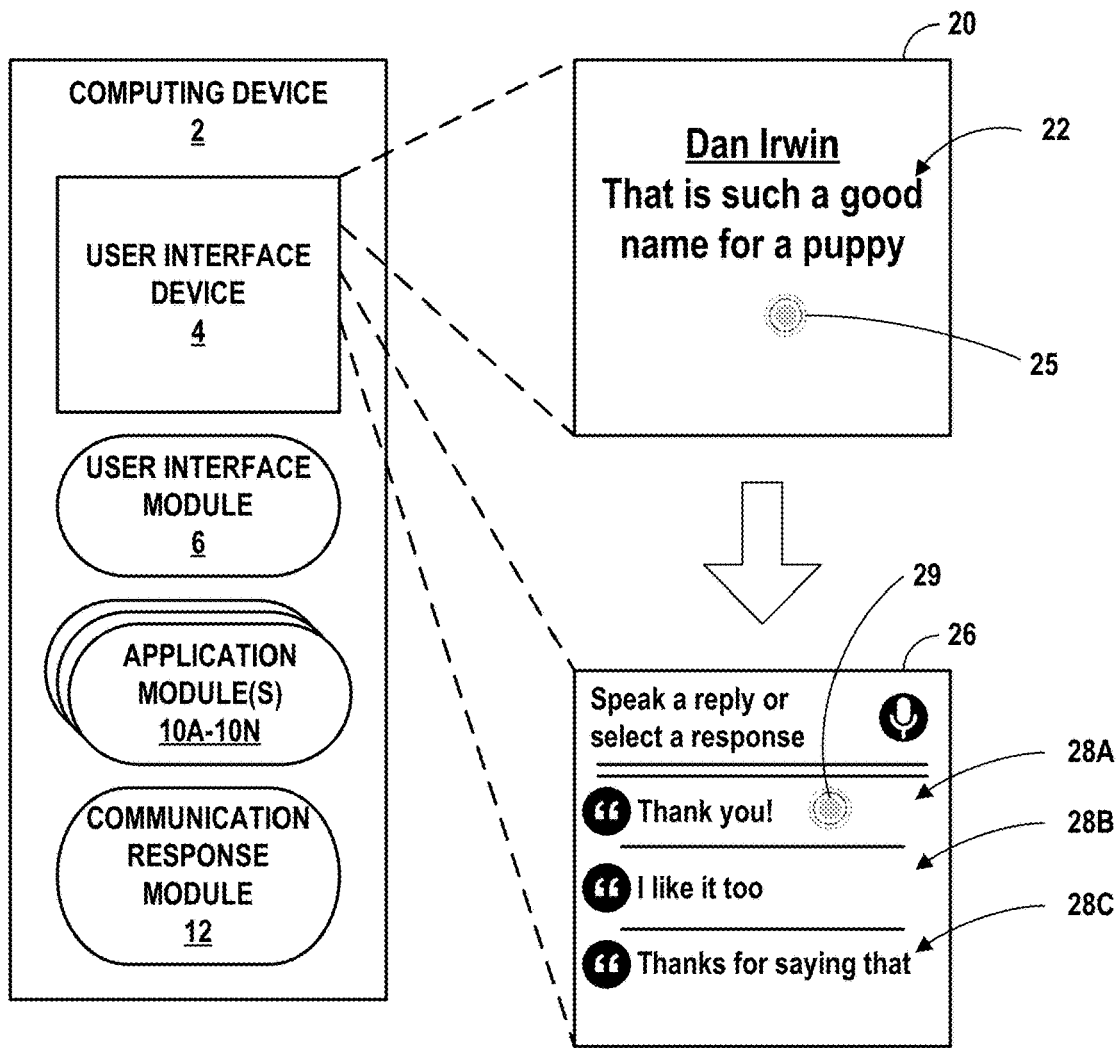
FIG. 1 is a block diagram illustrating an example computing device and graphical user interfaces (GUIs) that may be configured to provide candidate responses to a received communication, in accordance with one or more techniques of the present disclosure.

In general, aspects of the present disclosure are directed to providing candidate responses to reply to a received communication based on an on-device machine-trained model, as well as generating such a machine-trained model so that it is optimized for use on a mobile computing device, such as a smartphone or a wearable device (e.g., a smartwatch). A messaging application on a computing device may receive communications and may utilize a machine-trained model on the computing device to predict candidate responses that are relevant to the received communications. The messaging application may present the candidate responses predicted by the model, and may enable a user to select one of the presented candidate responses to send to the originator of the received communications.

Providing candidate responses to reply to a received communication may be useful in situations where providing textual input to respond to the received communication may be cumbersome or socially unacceptable, by enabling a user to reply to a received communication in a quick and inconspicuous fashion. In one example, if a smartwatch only provides voice input as a text entry option, such a text entry method may be unreliable or unusable in a noisy setting. In another example, there may be situations where it may be socially unacceptable for the user to speak to provide voice input or to write out a response to a received communication (e.g., when the user is in a meeting). As such, a computing device may provide candidate responses to reply to a received communication to enable the user of the computing device a quick, reliable, and convenient way to reply to the received communication.

The computing device may utilize a machine-trained model to generate candidate responses that are highly relevant to the received communication, to increase the likelihood that the user selects one of the candidate responses to respond to the received communication. Utilizing a machine-trained model may potentially decrease the amount of time a user needs to interact with the computing device to send a message to respond to the received communication because the user does not have to type, speak, or otherwise manually input a response message. By decreasing the amount of time the user needs to interact with the computing device, the computing device may be able to better conserve its power, thereby extending its battery life. Such power savings may be especially relevant if the computing device is a wearable computing device, such as a smartwatch, which may otherwise have extremely limited battery life.

In general, a machine-trained model may be trained over a large data set via machine learning techniques to infer an output for a given input. More specifically, in accordance with aspects of the present disclosure, a machine-trained model may be an application or module executing on the computing device that is generated from training over a large data set based on machine learning techniques to infer relevant candidate responses to a received communication. For example, the data set over which the model is machine-trained may include pairs of communications and replies to such communications, so that a computing system may perform machine training over such pairs of communications and replies to infer likely replies in response to received communications. A model training via machine learning may potentially be able to suggest candidate responses to a received communication that are more contextually relevant compared to other methods of determining candidate responses. By suggesting candidate responses that are contextually more relevant, the user may be more likely to select one of the suggested candidate responses to reply to an incoming message.

The model utilized by the computing device may operate completely on the computing device to generate candidate responses that are relevant to the received communication. That is, when determining one or more candidate responses to a received communication, the computing device does not send any indications of the received communication off-device (e.g., to the cloud) for processing by an off-device model (e.g., a machine-trained model that operates in the cloud). Similarly, the computing device may not receive any indications of the one or more candidate responses that are relevant to the received communication from another computing device. Instead, the computing device executes the on-device machine-trained model completely on the computing device to determine the one or more candidate responses that are relevant to a received communication. In this way, computing devices implementing techniques of this disclosure may utilize on-device machine-trained models to provide candidate responses that are relevant to a received communication without having to access external machine-trained models (e.g., as part of a cloud-based service) through a network (e.g., the Internet).

One potential advantage of an on-device model which can generate candidate responses without sending indications of the receive communication off of the device is that the on-device model may be usable even when the host computing device has only intermittent network connectivity, such as when the computing device has a poor cellular or shorter-range wireless (e.g., Wi-Fi) signal, or no network connectivity at all, such as when the computing device is set to airplane mode. The on-device model may also enable the host computing device to consume less network data and bandwidth because the computing device does not send the received communications to an off-device model.

Another potential advantage of an on-device model is that the on-device model may support end-to-end encryption for messaging applications. In end-to-end encrypted messaging applications, messages between a sender and a recipient are decrypted only on the computing devices of the sender or the recipient, but are otherwise in an encrypted form. As such, in end-to-end encryption, unencrypted messages cannot, for example, be sent to an external system for processing by an off-device model (e.g., a model in the cloud) to generate candidate responses to the message. This may help to improve the security of the communications between sender and recipient to protect such communications from surveillance or tampering by third-parties.

However, a computing device, especially a mobile computing device such as a smartphone or a smartwatch, may have relatively limited computing resources compared to a desktop computing device, server computing device, or a cloud computing system, because operation of a mobile computing device may, for example, be based on tradeoffs between performance and battery life, thermal output, and size constraints. As such, a machine-trained model designed for desktop or server computing devices may provide unacceptable performance when executed on a mobile computing device. For example, such a model may occupy too much memory space, or a device using such a model may take too long to generate candidate responses to a received communication. In addition, such a model may also excessively drain the power (e.g., battery) of the mobile computing device during its operations.

When determining the one or more candidate responses via the on-device machine-trained model, the computing device may personalize the one or more candidate responses based on the user's messaging history, such as text messages, e-mails, and the like, which were previously sent by the user. After being explicitly granted access by the user to access the user's messaging history, the computing device may access the user's messaging history to determine the one or more candidate responses based at least in part on the user's messaging history. For example, the computing device may include in the one or more candidate responses one or more messages that were previously sent by the user.

Thus, in accordance with aspects of the present disclosure, an on-device machine-trained model may be specifically designed for use by mobile computing devices so that it meets the resource constraints of the mobile computing device (e.g., memory, processing, and/or power consumption constraints). A remote computing device may perform machine learning to generate a machine-trained model, and this device may load the model onto a mobile computing device. The mobile computing device may utilize the model locally to generate candidate responses for a received communication without sending an indication of the received communication off the mobile computing device (e.g., sending the received communication via a network to the cloud).

FIG. 1 is a block diagram illustrating an example computing device 2 and graphical user interfaces (GUIs) 20 and 26 for providing candidate responses to reply to a received communication, in accordance with one or more techniques of the present disclosure. Examples of computing device 2 may include, but are not limited to, portable, mobile, or other devices, such as mobile phones (including smartphones), laptop computers, desktop computers, tablet computers, smart television platforms, personal digital assistants (PDAs), server computers, mainframes, and the like. For instance, in the example of FIG. 1, computing device 2 may be a wearable computing device, such as a smartwatch.

Computing device 2, as shown in the example of FIG. 1, includes user interface (UI) device 4. UI device 4 of computing device 2 may be configured to function as an input device and/or an output device for computing device 2. UI device 4 may be implemented using various technologies. For instance, UI device 4 may be configured to receive input from a user through tactile, audio, and/or video feedback. Examples of input devices include a presence-sensitive display, a presence-sensitive or touch-sensitive input device, a mouse, a keyboard, a voice responsive system, video camera, microphone or any other type of device for detecting a command from a user. In some examples, a presence-sensitive display includes a touch-sensitive or presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive technology. That is, UI device 4 of computing device 2 may include a presence-sensitive device that may receive tactile input from a user of computing device 2. UI device 4 may receive indications of the tactile input by detecting one or more gestures from the user (e.g., when the user touches or points to one or more locations of UI device 4 with a finger or a stylus pen).

UI device 4 may additionally or alternatively be configured to function as an output device by providing output to a user using tactile, audio, or video stimuli. Examples of output devices include a sound card, a video graphics adapter card, or any of one or more display devices, such as a liquid crystal display (LCD), dot matrix display, light emitting diode (LED) display, organic light-emitting diode (OLED) display, e-ink, or similar monochrome or color display capable of outputting visible information to a user of computing device 2. Additional examples of an output device include a speaker, a cathode ray tube (CRT) monitor, a liquid crystal display (LCD), or other device that can generate intelligible output to a user. For instance, UI device 4 may present output to a user of computing device 2 as a graphical user interface that may be associated with functionality provided by computing device 2. In this way, UI device 4 may present various user interfaces of applications executing at or accessible by computing device 2 (e.g., an electronic message application, an Internet browser application, etc.). A user of computing device 2 may interact with a respective user interface of an application to cause computing device 2 to perform operations relating to a function.

In some examples, UI device 4 of computing device 2 may detect two-dimensional and/or three-dimensional gestures as input from a user of computing device 2. For instance, a sensor of UI device 4 may detect the user's movement (e.g., moving a hand, an arm, a pen, a stylus) within a threshold distance of the sensor of UI device 4. UI device 4 may determine a two or three-dimensional vector representation of the movement and correlate the vector representation to a gesture input (e.g., a hand-wave, a pinch, a clap, a pen stroke) that has multiple dimensions. In other words, UI device 4 may, in some examples, detect a multi-dimension gesture without requiring the user to gesture at or near a screen or surface at which UI device 4 outputs information for display. Instead, UI device 4 may detect a multi-dimensional gesture performed at or near a sensor which may or may not be located near the screen or surface at which UI device 4 outputs information for display.

In the example of FIG. 1, computing device 2 includes user interface (UI) module 6, application modules 10A-10N (collectively "application modules 10"), and communication response module 12. Modules 6, 10, and/or 12 may perform one or more operations described herein using hardware, software, firmware, or a mixture thereof residing within and/or executing at computing device 2. Computing device 2 may execute modules 6, 10, and/or 12 with one processor or with multiple processors. In some examples, computing device 2 may execute modules 6, 10, and/or 12 as a virtual machine executing on underlying hardware. Modules 6, 10, and/or 12 may execute as one or more services of an operating system or computing platform or may execute as one or more executable programs at an application layer of a computing platform.

UI module 6, as shown in the example of FIG. 1, may be operable by computing device 2 to perform one or more functions, such as receive input and send indications of such input to other components associated with computing device 2, such as modules 10 and/or 12. UI module 6 may also receive data from components associated with computing device 2, such as modules 10 and/or 12. Using the data received, UI module 6 may cause other components associated with computing device 2, such as UI device 4, to provide output based on the received data. For instance, UI module 6 may receive data from one of application modules 10 to display a GUI.

Application modules 10, as shown in the example of FIG. 1, may include functionality to perform any variety of operations on computing device 2. For instance, application modules 10 may include a word processor, an email application, a chat application, a messaging application, a social media application, a web browser, a multimedia player, a calendar application, an operating system, a distributed computing application, a graphic design application, a video editing application, a web development application, or any other application. In some examples, one or more of application modules 10 may be operable to receive communications from other devices, such as email messages, calendar alerts or meeting requests, or other communications. For instance, one of application modules 10 (e.g., application module 10A) may be a text messaging application (e.g., SMS/MMS), an internet messaging application, or other suitable applications that include messaging functionality. Application module 10A may include functionality to compose and send communications, receive communications, respond to received communications, and other functions.

In the example of FIG. 1, communication response module 12 may be operable to determine relevant candidate responses to received communications, in accordance with the techniques described herein. That is, communication response module 12 may include functionality to provide one or more relevant reply messages that a user may select to cause computing device 2 to send the message as a response to a received communication. Relevance (e.g., of an operation or of a response message), generally, may be an indication of relatedness and/or similarity (e.g., semantic similarity, contextual similarity, or any other type of similarity). Relevance, in some examples, may be represented by a probability value or score that indicates a level of relatedness between two objects, or a level of relatedness between two groups of objects (e.g., the number of objects that exist in both groups, the number of objects in one group that exist in the other group, the percentage of objects that exist in both groups, or other value). In the case of a received communication, relevant reply messages to the received communications may be reply messages that are highly likely or probable to be selected by the user as the reply message to the received communications.

Computing device 2 may, in the example of FIG. 1, receive a communication. A received communication may include information (e.g., generated based on input provided by a user of another device). Examples of information that may be included in a received communication include text (e.g., letters, words, numbers, punctuation), emoji, images or icons, video, audio, digital payments, or other information. The received communication may be structured or formatted according to one or more protocols. For instance, a received communication may be an Internet message. The Internet message may include the textual information, such as "That is such a good name for a puppy." In some examples, a received communication may also be known as a text message, a Short Message Service (SMS) message, an instant message, and the like that may be received by application module 10A, which may be an SMS service, an instant message application, a chat application, a messenger application, or any other suitable service or application.

In the example of FIG. 1, responsive to receiving a communication, computing device 2 may output an indication of the received communication for display. In general, an indication of a received communication may be any visual representation of the communication, such as a notification or other visual object output for display as part of a graphical user interface (GUI). Computing device 2 may provide the message to one or more of application modules 10 that are specified to handle Internet messages, such as application module 10A. Application module 10A may receive the Internet message and may cause one or more other components of computing device 2 to output an indication of the message (e.g., for display to a user of computing device 2). That is, responsive to receiving the internet message, application module 10A may send data to UI module 6 to cause UI device 4 to display GUI 20. As shown in the example of FIG. 1, GUI 20 includes an indication of the information included in the Internet message (e.g., text 22, "That is such a good name for a puppy"). In some examples, an application module may cause additional or other information to be output for display, such as a time at which the message was received.

Computing device 2 may, in the example of FIG. 1, receive an indication of input that instructs computing device 2 to enable a user to compose and/or select a response to the received communication. For instance, a user of computing device 2 may perform input 25 at UI device 4. UI device 4 may detect input 25 and send an indication of the input to UI module 6. UI module 6 may provide data to application module 10A based on the received indication and application module 10A may determine that input 25 corresponds to a selection of element 24.

In the example of FIG. 1, computing device 2 may determine one or more candidate responses to the received communication, based at least in part on the received communication. Responsive to receiving data indicating a user's selection to respond to the Internet message (e.g., an indication of input 25), application module 10A may communicate with communication response module 12 to obtain at least one candidate response. A candidate response may be a message that a user may select as a response to a received communication. For instance, in the example of FIG. 1, each candidate response determined by communication response module 12 may be a message that computing device 2 may send, based on a user's selection, to respond to the internet message, "That is such a good name for a puppy". Examples of candidate responses may include one or more of text (e.g., letters, words, numbers, punctuation), emoji, images or icons, memes, video, audio, or other content.

To obtain candidate responses, application module 10A may request candidate responses from communication response module 12. In some examples, a request for candidate responses to a received communication may include at least a portion of the information included in the received communication. In some examples, a request may include additional or other information, such as communication metadata, location information, user information, other communications (e.g., other messages in the thread or chain of communications between the user of computing device 2 and the sender of the received communication), or other information about the received communication, about the computing device, or about a user of the computing device. In some examples, application modules 10 only generates a request and/or obtain personal data (e.g., information included in the received communication and/or other information) if a user of computing device 2 provides explicit permission for application modules 10 to do so.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In accordance with aspects of the present invention, communication response module 12 may receive a request from application 10A to generate candidate responses to respond to a received communication, and may determine candidate responses by utilizing a machine-trained model to generate one or more candidate responses that are relevant to the received communication. The machine-trained model may be generated and trained off-device via machine learning techniques and loaded onto computing device 2 for use to generate candidate responses. When generating candidate responses, the machine-trained model does not send any indications of the received communication off-device. That is, the machine-trained model, when executing at computing device 2, does not utilize a model or any other applications or services running at a remote computing device, such as a remote server system or a cloud computing resource, in order to generate the candidate responses. Further details with respect to how the machine-trained model is generated are described with respect to FIG. 4, while further details with respect to how computing device 2 utilizes the machine-trained model to generate candidate responses are described with respect to FIG. 5.

In the non-limiting example of FIG. 1, communication response module 12 may determine one or more candidate responses to the Internet message, "That is such a good name for a puppy," and send at least an indication of the one or more candidate responses to application module 10A. Application module 10A may receive the indication of the determined candidate responses and send data to UI module 6 to cause UI device 4 to display at least one of the candidate responses. For instance, application module 10A may send data to cause UI device 4 to output GUI 26.

GUI 26, as shown in the example of FIG. 1, includes response options 28A-28C (collectively, "response options 28"). Response options 28 may each represent a candidate response received from communication response module 12. That is, responsive to receiving a request for candidate responses to the SMS message "That is such a good name for a puppy", communication response module 12 may determine a set of candidate responses for responding to the incoming communication. Communication response module 12 may select some or all of the set of candidate responses to present in GUI 26. In the example of FIG. 1, communication response module 12 may select three candidate responses to present in GUI 26: "Thank you!", "I like it too", and "Thanks for saying that," which correspond to response options 28A, 28B, and 28C, respectively.

While each representing a candidate response received from communication response module 12 in the example of FIG. 1, one or more of response options 28 may, in other examples, represent or include other response options, such as responses provided by application module 10A. In some examples, an application module may modify one or more received candidate responses based on various types of information, and one or more of response options 28 may represent a modified candidate response. In any case, response options 28 of GUI 26 may enable the user of computing device 2 to select a candidate response to cause computing device 2 to send in response to the received internet message. In some examples, GUI 26 may include a manual entry option. A manual entry option may enable the user of computing device 2 to input (e.g., using voice input, touch input, or other input) a custom response. A custom response may be used when, for example, the responses indicated by one of response options 28 are incorrect or inaccurate.

In the example of FIG. 1, computing device 2 may receive an indication of user input that selects a candidate response from the one or more candidate responses. An indication of user input, generally, may be data representing input provided by a user at one or more input devices, such as touch or haptic input, voice input or other audio input, or any other form of input. For instance, the user of computing device 2 may provide input 29 at UI device 4, which may include a tap gesture at or near the location of UI device 4. UI device 4 may detect input 29 and send an indication of the input to UI module 6. UI module 6 may provide data to application module 10A based on the received indication, and application module 10A may determine that input 29 corresponds to a selection of response option 28A.

Responsive to receiving the indication of user input that selects the candidate response, computing device 2 may, in the example of FIG. 1, send the candidate response. That is, selecting one of response options 28 or inputting a custom response may cause application module 10A to respond to the received communication by sending the selected response to one or more other computing devices, which may include a computing device of the recipient for the message. For instance, responsive to receiving an indication of input 29 that selects response option 28A, application module 10A may send the candidate response corresponding to response option 28A (e.g., "Thank you!"). In some examples, the selected response may be sent directly to the computing device from which the Internet message was received. In some examples, the selected response may be sent to additional or other computing devices, such as one or more devices that, together, represent a network to which computing device 2 is connected (e.g., a cellular or wireless network). That is, computing device 2 may send the selected response to the computing device from which the Internet message was received by sending the response to network devices or other devices situated along a route between the two computing devices. In some examples, the selected response may additionally or alternatively be sent to other devices, such as a server system or a cloud computing environment, for subsequent use in providing improved candidate responses.

By providing candidate responses that are relevant to a received communication, techniques of the present disclosure may reduce the amount of time required for a user of computing device 2 to input a response to a received communication. For instance, wearable computing devices, such as watches or other devices, may be able to display candidate responses to a user that are based on a received communication, thereby enabling the user to quickly tap or otherwise select one of the candidate responses instead of having to use voice recognition or other means to input a response. Further, by generating the candidate responses via a machine-trained model, computing devices may be able to generate candidate responses that are more likely to be selected by the user to provide as a response to the received communications, thereby decreasing the need for the user to use voice recognition or other means to input a response. In addition, computing device 2 may reduce the latency of generating candidate responses via an on-device machine-trained model versus having to send and receive information via the Internet to and from an off-device machine-trained model.

Figure 2:
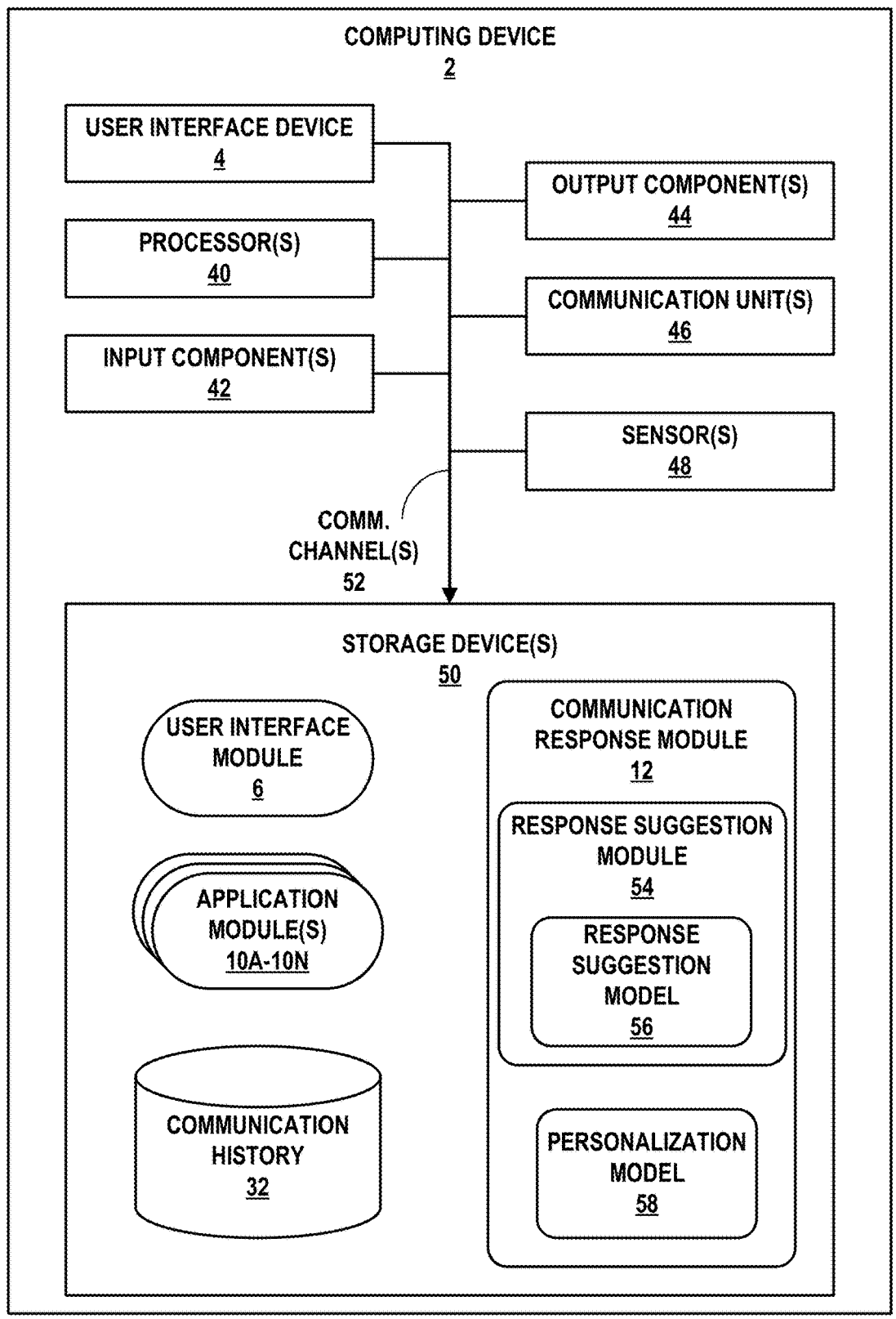
FIG. 2 is a block diagram illustrating details of one example of a computing device that may be configured to provide candidate responses to a received communication, in accordance with one or more techniques of the present disclosure.

FIG. 2 is a block diagram illustrating details of one example of computing device 2 for performing contextually related operations responsive to sending a response to a received communication, in accordance with one or more techniques of the present disclosure. FIG. 2 is described below within the context of FIG. 1. FIG. 2 illustrates only one example of computing device 2, and many other example devices having more, fewer, or different components may also be configurable to perform operations in accordance with techniques of the present disclosure.

While displayed as part of a single device in the example of FIG. 2, components of computing device 2 may, in some examples, be located within and/or part of different devices. For instance, in some examples, some or all of the functionality of communication response module 12 may be located at a server system or other computing device (e.g., accessible by computing device 2 via a network). That is, in some examples, techniques of the present disclosure may be performed and utilized by a single computing device, while in other examples, the techniques may be performed and/or utilized at a remote computing system, such as a distributed or "cloud" computing system. In some such examples, computing device 2 may receive a communication and determine candidate responses by providing at least a portion of the received communication to a remote device (e.g., a server system) and receiving a response that includes the candidate responses. Responsive to receiving a selection of one of the candidate responses, computing device 2 may determine an operation contextually related to the candidate response by sending at least an indication of the selected candidate response to a remote device and receiving a response that includes instructions that are executable to perform the operation.

In some examples, computing device 2 may represent a wearable computing device. A wearable computing device may be any computing device wearable or otherwise attachable to a user, such as a smartwatch, a head-mounted computing device (e.g., a computing device incorporated into glasses, a hat, earphones, a contact lens or other like items), implantable devices, or any other device a user may attach to his or her person. Some wearable computing devices, such as a smartwatch, may include one or more input devices to receive various types of input from a user, one or more output devices to provide audio, visual, tactile, or other output to the user, one or more network interfaces to communicate with other computing devices, one or more sensors to obtain information, and/or other components.

In some examples, a wearable device may communicate with a mobile device (e.g., a smartphone) or other device to perform some operations. For instance, in some examples, part of the techniques of the present disclosure may be performed by a smartwatch, while part may be performed by one or more other computing devices (e.g., a smartphone that is wirelessly linked with the smartwatch, a server device with which the smartphone may communicate, or other devices). In other words, while described herein as being performed by one or more components of computing device 2, some of the components configurable to determine candidate responses and/or contextually related operations may be distributed among a plurality of computing devices in accordance with the techniques described herein.

As shown in the example of FIG. 2, computing device 2 includes user interface (UI) device 4, one or more processors 40, one or more input components 42, one or more output components 44, one or more communications units 46, one or more sensors 48 and one or more storage devices 50. Storage devices 50 further include user interface (UI) module 6, communication response module 12, application modules 10, and communication response module 14. Communication response module 14, in the example of FIG. 2, includes response suggestion module 54.

Each of components 4, 40, 42, 44, 46, 48, and 50 may be interconnected (physically, communicatively, and/or operatively) for inter-component communications. In the example of FIG. 2, components 4, 40, 42, 44, 46, 48, and 50 may be coupled by one or more communications channels 52. In some examples, communications channels 52 may include a system bus, network connection, inter-process communication data structure, or any other channel for communicating data. Modules 6, 10, 12, and 54 may also communicate information with one another as well as with other components in computing device 2.

In the example of FIG. 2, one or more input components 42 may be operable to receive input. Examples of input are tactile, audio, and video input. Input components 42, in one example, include a presence-sensitive or touch-sensitive display, a mouse, a keyboard, a voice responsive system, a video camera, a microphone or other audio sensor, or any other type of device for detecting input from a human or machine.

One or more output components 44 may be operable, in the example of FIG. 2, to generate output. Examples of output are tactile, audio, and video output. Output components 44 of computing device 2, in some examples, include a presence-sensitive display, sound card, video graphics adapter card, speaker, cathode ray tube (CRT) monitor, liquid crystal display (LCD), or any other type of device for generating output to a human or machine.

In some examples, UI device 4 may include functionality of input components 42 and/or output components 44. In the example of FIG. 2, for instance, UI device 4 may be or may include a presence-sensitive input device. In some examples, a presence-sensitive input device may detect an object at and/or near the presence-sensitive input device. As one example range, a presence-sensitive input device may detect an object, such as a finger or stylus that is within two inches or less of the presence-sensitive input device. In another example range, a presence-sensitive input device may detect an object that is six inches or less from the presence-sensitive input device, and other ranges are also possible. The presence-sensitive input device may determine a location (e.g., an (x,y) coordinate) of the presence-sensitive input device at which the object was detected. The presence-sensitive input device may determine the location selected by the input device using capacitive, inductive, and/or optical recognition techniques. In some examples, presence-sensitive input device provides output to a user using tactile, audio, or video stimuli as described with respect to output components 44, and may be referred to as a presence-sensitive display.

While illustrated as an internal component of computing device 2, UI device 4 may also represent an external component that shares a data path with computing device 2 for transmitting and/or receiving input and output. That is, in some examples, UI device 4 may represent a built-in component of computing device 2, located within and physically connected to the external packaging of computing device 2 (e.g., a screen on a mobile phone or wearable computing device). In some examples, UI device 4 may represent an external component of computing device 2, located outside and physically separated from the packaging of computing device 2 (e.g., a monitor, a projector, or other display device that shares a wired and/or wireless data path with computing device 2).

In the example of FIG. 2, one or more communication units 46 may be operable to communicate with external devices via one or more networks by transmitting and/or receiving network signals on the one or more networks. For example, computing device 2 may use communication units 46 to transmit and/or receive radio signals on a radio network such as a cellular radio network. Likewise, communication units 46 may transmit and/or receive satellite signals on a satellite network such as a global positioning system (GPS) network. Examples of communication unit 46 include a network interface card (e.g. such as an Ethernet card), an optical transceiver, a radio frequency transceiver, or any other type of device that can send and/or receive information. Other examples of communication units 46 may include Near-Field Communications (NFC) units, Bluetooth® radios, short wave radios, cellular data radios, wireless network (e.g., Wi-Fi®) radios, as well as universal serial bus (USB) controllers.

One or more sensors 48 may, in the example of FIG. 2, be operable to generate data for use by components of computing device 2. Sensors 48 may include any device or component capable of obtaining data about computing device 2, data about an environment in which computing device 2 is situated, data about a user of computing device 2, or other data. That is, any of sensors 48 may be hardware, firmware, software, or a combination thereof for obtaining information. Examples of sensors 48 may include a GPS sensor or GPS radio, a position sensor, an accelerometer, a gyroscope, or other motion sensor, a camera, a compass, a magnetometer, a light sensor, an infrared sensor, a microphone or other audio sensor, a radiation sensor, a temperature sensor, a barometer, an altimeter, or other data gathering components.

One or more storage devices 50 may be operable, in the example of FIG. 2, to store information for processing during operation of computing device 2. In some examples, storage devices 50 may represent temporary memory, meaning that a primary purpose of storage devices 50 is not long-term storage. For instance, storage devices 50 of computing device 2 may be volatile memory, configured for short-term storage of information, and therefore not retain stored contents if powered off. Examples of volatile memories include random access memories (RAM), dynamic random access memories (DRAM), static random access memories (SRAM), and other forms of volatile memories known in the art.

Storage devices 50, in some examples, also represent one or more computer-readable storage media. That is, storage devices 50 may be configured to store larger amounts of information than a temporary memory. For instance, storage devices 50 may include non-volatile memory that retains information through power on/off cycles. Examples of non-volatile memories include magnetic hard discs, optical discs, floppy discs, flash memories, or forms of electrically programmable memories (EPROM) or electrically erasable and programmable (EEPROM) memories. In any case, storage devices 50 may, in the example of FIG. 2, store program instructions and/or data associated with modules 6, 10, 12, and 54.

In the example of FIG. 2, one or more processors 40 may be configured to implement functionality and/or execute instructions within computing device 2. For example, processors 40 may be operable to receive and execute instructions stored at storage devices 50 that implement the functionality of UI module 6, application modules 10, communication response module 12, and response suggestion module 54. These instructions, executed by processors 40, may cause computing device 2 to store information within storage devices 50 (e.g., temporary memories) during program execution. Processors 40 may execute instructions of modules 6, 10, 12, and 54 to cause UI device 4 to output candidate responses in response to computing device 2 receiving a communication. That is, modules 6, 10, 12, and 54 may be operable by processors 40 to perform various actions, including predicting candidate responses to a received communication.

Computing device 2 may, in the example of FIG. 2, receive a communication. The communication may be message or a series of messages. For example, the communication may be a series of messages (e.g., text messages) sent by a user from a remote computing device to the user of computing device 2. In some examples, one of communication units 46 may receive data from a network (e.g., a wireless network, cellular network, the Internet, an intranet, etc.) adhering to the SMS protocol and representing a text message, or data from a network adhering to a particular internet messaging format. Communications units 46 may provide the received data to one or more of application modules 10 that are designated (e.g., previously designated by a user) to handle the received data, such as application module 10A.

Application module 10A may receive the text message and cause computing device 2 to output at least an indication of the text message. For instance, application module 10A may send information to UI module 6 that causes UI device 4 or any of output components 44 to display a visual representation of the text (e.g., "That is such a good name for a puppy") included in the text message, as well as any images, videos, emojis, stickers, and the like included in the text message. The user of computing device 2 may view the output and provide input that instructs computing device 2 to respond to the text message. That is, UI module 6 may receive an indication of input, performed at UI device 4 or any of input components 42 that selects an option to respond to the received text message. UI module 6 may provide the indication of input to application module 10A.

Responsive to receiving the input to instruct computing device 2 to respond to the text message, application module 10A may request candidate responses from communication response module 12. In requesting candidate responses, application module 10A may provide information that was included in the text message (e.g., the text "That is such a good name for the puppy") and/or other information (e.g., an indication of the sender of the text message, an indication of previous text messages exchanged between the sender and the recipient, an indication of images, videos, and the like included in the text message, and the like). That is, a request for candidate responses, in various examples, may include information that was included in a received email, a received text message, a received application notification, a received calendar invite, a reminder, or other communication. In some examples, the request for candidate responses may include all of the information included in the received communication. That is, the request may include the entire email, text message, etc. In other examples, the request may include a portion of information. For instance, the request may include a date and time indicated in the received communication, an indicated location, the names of participants in a meeting, emoji, a picture, or other information. Communication response module 12 may receive the request for candidate responses and provide the request to response suggestion module 54.

Response suggestion module 54 may be operable to receive a request for candidate responses for responding to a received communication. In response to receiving the request, response suggestion module 54 may determine one or more candidate responses to the received communication. Response suggestion module 54 may use various machine learning techniques to determine the one or more candidate responses to the received communication.

Response suggestion module 54 may include or be operably coupled to response suggestion model 56. Response suggestion module 54 may use response suggestion model 56 to determine the one or more candidate responses to the received communication. Response suggestion model 56 may be a machine-trained model that is trained off-device (i.e., on a device other than computing device 2) to learn likely responses to received communications.

Response suggestion model 56 may include a set of bit vectors associated with rank lists of predicted responses, so that each bit vector is associated with a ranked list of predicted responses. Response suggestion module 54 may transform the received communication to a fixed-length bit vector, such as, for example, an 8-bit vector. For example, response suggestion module 54 may perform a modified form of locality sensitive (LSH) hashing to project the received communication to a bit vector. Because response suggestion model 56 has been machine trained to associate each bit vector with a ranked list of predicted responses, response suggestion module 54 may determine one or more candidate responses to the received communication based at least in part on the ranked list of predicted responses associated with the bit vector.

To determine the candidate responses from the ranked list of predicted responses, response suggestion module 54 may, for example, take the top N predicted responses as the candidate responses, where N may be the number of candidate responses that are to be output by UI module 6 for display by UI device 4, or may be any other suitable integer number, such as 3, 4, etc. In other examples, N may be the number of candidate responses that are to be output by UI module 6 apart from one or more other candidate responses determined via other methods (e.g., one or more other default candidate responses) that will also be output by UI module 6.

Response suggestion module 54 may hash received communications that are semantically similar into similar bit vectors. Bit vectors may be considered similar if they include a substantial overlap of the same bits. For example, response suggestion module 54 may hash a received communication of "Howdy, everything going well?" into a bit vector of "11100110" while response suggestion module 54 may hash a received communication of "How's it going buddy?" into a bit vector of "11100011". Further, because the received communications and the resulting hashed bit vectors are similar, the resulting hashed bit vector may map to similar or the same ranked lists of predicted responses. For example, in this example, both bit vectors may map to the same ranked list of predicted responses of "Pretty good, you?" and "I am doing well, how about you?"

Response suggestion module 54 may also personalize the candidate responses it generates by determining one or more personalized candidate responses and by including the one or more personalized candidate responses in the candidate responses. To that end, response suggestion module 54 may utilize personalization model 58 to generate one or more personalized candidate responses based on previous responses sent by the user of computing device 2 to respond to previously received messages intended for the user. Because previous responses sent by the user may better capture the style of writing of the user, such as the tone, formality, capitalization, grammar, and the like, including such previous responses in the candidate responses may better personalize the candidate responses that are generated to respond to the received communication.

Application modules 10, such as one or more messaging applications capable of sending and receiving messages and sending responses to messages may store a message history of previously sent and received messages into communication history 32. Communication history 32 may contain information associated with previous messages received by computing device 2 that were intended for the user, as well as responses to those previous messages sent by the user. Such previously received messages and previous responses may be stored as structured and/or unstructured data which may be searchable and/or otherwise categorized. In some examples, data within communication history 32 may be encrypted to protect the privacy of the user.

Communication response module 12 may include personalization model 58. Personalization model 58 may determine whether any previous responses sent by the user are semantically similar (e.g., have similar intent) to one or more the predicted responses for received communication, and to include those previous responses. If so, response suggestion module 54 may include the previous response that is semantically similar to a predicted response as a personalized candidate response. Response suggestion module 54 may replace the predicted response with the personalized candidate response in the set of candidate responses, or may include the personalized candidate response in the candidate responses in addition to the predicted response.

After determining candidate responses, response suggestion module 54 may provide the candidate responses to application module 10A. In the example of FIG. 2, application module 10A may receive the candidate responses and send data to UI module 6 to cause UI device 4 or one or more of output components 44 to display a representation of the candidate responses. The user of computing device 2 may view the displayed responses and provide input that selects one of the candidate responses or inputs a custom response. That is, UI module 6 may receive an indication of input, performed at UI device 4 or any of input components 42 that selects a response option representing a candidate response or that inputs a custom response. UI module 6 may provide the indication of input to application module 10A. Application module 10A may receive the indication of input that selects a response and, responsive to receiving the indication, may send the selected response. For instance, in the example of FIG. 2, application 10A may receive an indication of input to select the candidate response "Thank you!" and may send the selected candidate response (e.g., to the sender of the received communication).

In some examples, personalization model 58 and/or communication history 32 may not be stored in storage devices 50, but may instead be stored on an external computing device, so that personalization model 58 may execute on an external computing device. For example, if computing device 2 is a wearable device, such as a smartwatch, computing device 2 may be paired with an external computing device such as a smartphone. In this case, computing device 2 may send and receive communication (e.g., text messages) via the external computing device, so that the external computing device may forward received communications to computing device 2 and may forward messages sent from computing device 2 to the messages' intended recipients.

Figure 3:
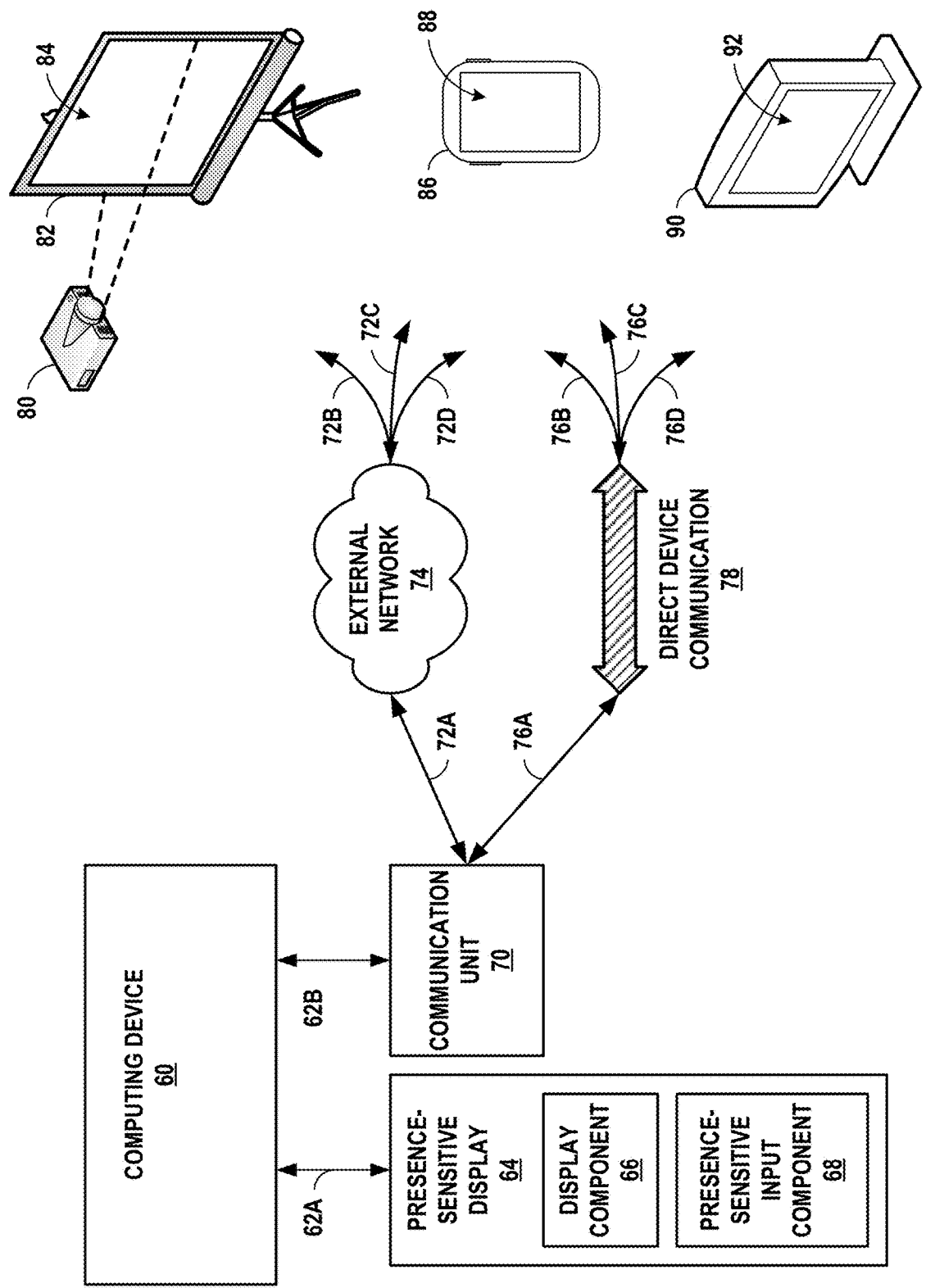
FIG. 3 is a block diagram illustrating an example computing device that may be configured to output graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 60, presence-sensitive display 64, communication unit 70, projector 80, projector screen 82, mobile device 86, and visual display device 90. Although shown for purposes of example in FIGS. 1 and 2 as a stand-alone computing device 2, a computing device such as computing device 60 may, generally, be any component or system that includes a processor or other suitable computing environment for executing software instructions and, for example, need not include a presence-sensitive display.

As shown in the example of FIG. 3, computing device 60 may be a processor that includes functionality as described with respect to processors 40 in FIG. 2. In such examples, computing device 60 may be operatively coupled to presence-sensitive display 64 by a communication channel 62A, which may be a system bus or other suitable connection. Computing device 60 may also be operatively coupled to communication unit 70, further described below, by a communication channel 62B, which may also be a system bus or other suitable connection. Although shown separately as an example in FIG. 3, computing device 60 may be operatively coupled to presence-sensitive display 64 and communication unit 70 by any number of one or more communication channels.

In other examples, such as illustrated previously by computing device 2 in FIGS. 1-2, a computing device may refer to a portable or mobile device such as mobile phones (including smart phones), laptop computers, etc. In some examples, a computing device may be a desktop computer, tablet computer, smart television platform, camera, personal digital assistant (PDA), server, mainframe, etc.

Presence-sensitive display 64, as one of input components 42 and/or output components 44 as shown in FIG. 2, may include display component 66 and presence-sensitive input component 68. Display component 66 may, for example, receive data from computing device 60 and display the graphical content. In some examples, presence-sensitive input component 68 may determine one or more user inputs (e.g., continuous gestures, multi-touch gestures, single-touch gestures, etc.) at presence-sensitive display 64 using capacitive, inductive, and/or optical recognition techniques and send indications of such user input to computing device 60 using communication channel 62A. In some examples, presence-sensitive input component 68 may be physically positioned on top of display component 66 such that, when a user positions an input unit over a graphical element displayed by display component 66, the location at which presence-sensitive input component 68 corresponds to the location of display component 66 at which the graphical element is displayed. In other examples, presence-sensitive input component 68 may be positioned physically apart from display component 66, and locations of presence-sensitive input component 68 may correspond to locations of display component 66, such that input can be made at presence-sensitive input component 68 for interacting with graphical elements displayed at corresponding locations of display component 66.

As shown in FIG. 3, computing device 60 may also include and/or be operatively coupled with communication unit 70. Communication unit 70 may include functionality of communication units 46 as described in FIG. 2. Examples of communication unit 70 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 60 may also include and/or be operatively coupled with one or more other devices, e.g., input devices, output devices, memory, storage devices, etc. that are not shown in FIG. 3 for purposes of brevity and illustration.

FIG. 3 also illustrates a projector 80 and projector screen 82. Other such examples of projection devices may include electronic whiteboards, holographic display devices, and any other suitable devices for displaying graphical content. Projector 80 and projector screen 82 may include one or more communication units that enable the respective devices to communicate with computing device 60. In some examples, the one or more communication units may enable communication between projector 80 and projector screen 82. Projector 80 may receive data from computing device 60 that includes graphical content. Projector 80, in response to receiving the data, may project the graphical content onto projector screen 82. In some examples, projector 80 may determine one or more user inputs (e.g., continuous gestures, multi-touch gestures, single-touch gestures, etc.) at projector screen using optical recognition or other suitable techniques and send indications of such user input using one or more communication units to computing device 60. In such examples, projector screen 82 may be unnecessary, and projector 80 may project graphical content on any suitable medium and detect one or more user inputs using optical recognition or other such suitable techniques.

Projector screen 82, in some examples, may include a presence-sensitive display 84. Presence-sensitive display 84 may include a subset of functionality or all the functionality of UI device 4, input components 42 and/or output components 44 as described in this disclosure. In some examples, presence-sensitive display 84 may include additional functionality. Projector screen 82 (e.g., an electronic whiteboard), may receive data from computing device 60 and display the graphical content. In some examples, presence-sensitive display 84 may determine one or more user inputs (e.g., continuous gestures, multi-touch gestures, single-touch gestures, etc.) at projector screen 82 using capacitive, inductive, and/or optical recognition techniques and send indications of such user input using one or more communication units to computing device 60.

FIG. 3 also illustrates mobile device 86 and visual display device 90. Mobile device 86 and visual display device 90 may each include computing and connectivity capabilities. Examples of mobile device 86 may include e-reader devices, convertible notebook devices, hybrid slate devices, etc. Examples of visual display device 90 may include other semi-stationary devices such as televisions, computer monitors, etc. As shown in FIG. 3, mobile device 86 may include a presence-sensitive display 88. Visual display device 90 may include a presence-sensitive display 92. Presence-sensitive displays 88, 92 may include a subset of functionality or all the functionality of input components 42 and/or output components 44 as described in this disclosure. In some examples, presence-sensitive displays 88, 92 may include additional functionality. In any case, presence-sensitive display 92, for example, may receive data from computing device 60 and display the graphical content. In some examples, presence-sensitive display 92 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 60.

As described above, in some examples, computing device 60 may output graphical content for display at presence-sensitive display 64 that is coupled to computing device 60 by a system bus or other suitable communication channel. Computing device 60 may also output graphical content for display at one or more remote devices, such as projector 80, projector screen 82, mobile device 86, and visual display device 90. For instance, computing device 60 may execute one or more instructions to generate and/or modify graphical content in accordance with techniques of the present disclosure. Computing device 60 may output the data that includes the graphical content to a communication unit of computing device 60, such as communication unit 70. Communication unit 70 may send the data to one or more of the remote devices, such as projector 80, projector screen 82, mobile device 86, and/or visual display device 90. In this way, computing device 60 may output the graphical content for display at one or more of the remote devices. In some examples, one or more of the remote devices may output the graphical content at a presence-sensitive display that is included in and/or operatively coupled to the respective remote devices.

In some examples, computing device 60 may not output graphical content at presence-sensitive display 64 that is operatively coupled to computing device 60. In other examples, computing device 60 may output graphical content for display at both a presence-sensitive display 64 that is coupled to computing device 60 by communication channel 62A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 60 and output for display at presence-sensitive display 64 may be different than graphical content display output for display at one or more remote devices.

Computing device 60 may send and receive data using any suitable communication techniques. For example, computing device 60 may be operatively coupled to external network 74 using network link 72A. Each of the remote devices illustrated in FIG. 3 may be operatively coupled to external network 74 by one of respective network links 72B, 72C, and 72D. External network 74 may include network hubs, network switches, network routers, etc., that are operatively inter-coupled thereby providing for the exchange of information between computing device 60 and the remote devices illustrated in FIG. 3. In some examples, network links 72A-72D may be Ethernet, ATM or other network connections. Such connections may be wireless and/or wired connections.

In some examples, computing device 60 may be operatively coupled to one or more of the remote devices included in FIG. 3 using direct device communication 78. Direct device communication 78 may include communications through which computing device 60 sends and receives data directly with a remote device, using wired or wireless communication. That is, in some examples of direct device communication 78, data sent by computing device 60 may not be forwarded by one or more additional devices before being received at the remote device, and vice-versa. Examples of direct device communication 78 may include Bluetooth, Near-Field Communication, Universal Serial Bus, Wi-Fi, infrared, etc. One or more of the remote devices illustrated in FIG. 3 may be operatively coupled with computing device 60 by communication links 76A-76D. In some examples, communication links 76A-76D may be connections using Bluetooth, Near-Field Communication, Universal Serial Bus, infrared, etc. Such connections may be wireless and/or wired connections.

In accordance with techniques of the disclosure, computing device 60 may be operatively coupled to visual display device 90 using external network 74. Computing device 60 may output graphical content for display at presence-sensitive display 92. For instance, computing device 60 may send data that includes a GUI for one or more of application modules 10 to communication unit 70. Communication unit 70 may send the data that includes the GUI to visual display device 90 using external network 74. Visual display device 90, in response to receiving the data using external network 74, may cause presence-sensitive display 92 to output the GUI. In response to receiving one or more user inputs, such as a gesture at presence-sensitive display 92 (e.g., at a region of presence-sensitive display 92), visual display device 90 and other of input components 42 may send indications of the inputs to computing device 60 using external network 74. Communication unit 70 of may receive the indications of the inputs, and send the indications to computing device 60.

Computing device 60 may, in the example of FIG. 3, receive a communication. Computing device 60 may output an indication of the received communication (e.g., for display). For instance, computing device 60 may send data for a visual representation of the received communication to communication unit 70. Communication unit 70 may send the data to visual display device 90 via external network 74. Visual display device 90 may cause presence-sensitive display 92 to output the visual representation of the received communication for display.

Responsive to receiving an indication of user input to respond to the received communication (e.g., input performed at one of input components 42), computing device 60 (e.g., communication response module 12) may determine one or more candidate responses. Computing device 60 may send data for a visual representation of at least one of the one or more candidate responses to communication unit 70 for display.

Computing device 60 may receive input that selects a candidate response from the one or more candidate responses and may send the candidate response (e.g., in response to the received communication). Communication unit 70 may send the data to visual display device 90 via external network 74. Visual display device 90 may cause presence-sensitive display 92 to output the visual interface (e.g., to a user).

Figure 4:
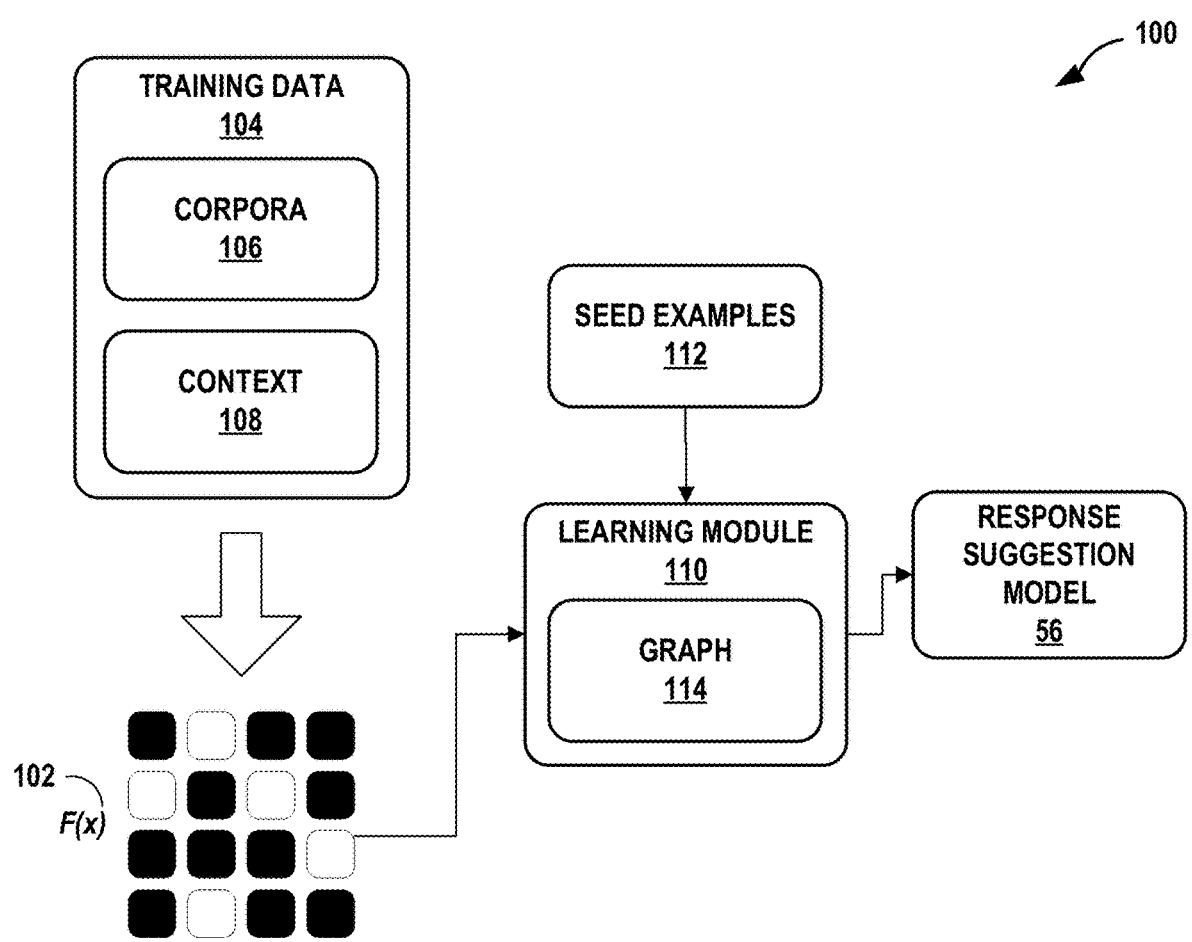
FIG. 4 is a block diagram illustrating example techniques for machine training a model that an example computing device may utilize to generate candidate responses for a received communication, in accordance with one or more techniques of the present disclosure

FIG. 4 is a block diagram illustrating example techniques for machine training a model that computing device 2 may utilize to generate candidate responses for a received communication, in accordance with one or more techniques of the present disclosure. As shown in FIG. 4, system 100 may include one or more computing devices, such as one or more desktop or server computing devices, cluster of computing devices, and the like, that performs machine learning to build an analytical model that is able to infer one or more relevant candidate responses for a received communication. In some examples, system 100 may be external from computing device 2. Specifically, system 100 may execute learning module 110 to perform machine learning by analyzing training data 104 to learn which candidate responses may be relevant to respond to messages to generate response suggestion model 56 that is used by response suggestion module 54 of computing device 2 to infer one or more candidate responses that are relevant to a received communication.

Training data 104 may include chat corpora 106 and context 108. Chat corpora 106 may include chat and messaging data, such as logs and transcripts of Internet messages, SMS messages, internet chats, instant messages, direct messages on social media platforms, chat room messages, online conversations, received communication-reply message pairs, and the like, such that chat corpora 106 contains a variety of messages and replies to those messages that system 100 may use to train response suggestion module 54.

Context 108 may be contextual information associated with the chat and messaging data included in chat corpora 106 that may be useful in determining likely response candidates to messages. For example, context 108 may include one or more of the usernames of the senders and recipients of the messages within chat corpora 106, the relationship between the sender and recipients, the location of the senders and recipients, the time of day at which the senders and recipients sent and received messages, the type of the messages (e.g., internet chat, text message, instant message, or other type), occupation of the senders and recipients, activities in which the senders and recipients are engaged, and the like.

As discussed above, response suggestion model 56 is intended to be included in a mobile computing device, such as computing device 2, having relatively low processing performance and relatively little memory. As such, system 100 may perform a variety of techniques to generate response suggestion model 56 that has relatively lower processing and memory requirements. To that end, system 100 may perform machine learning using learning module 110 over training data 104 to generate response suggestion model 56 that is used by response suggestion module 54 based on a randomized prediction model (RPM) architecture, such that both the machine learning performed by learning module 110 as well as the inferences for response suggestion model 56 are based on the RPM architecture.

In some examples, training data 104 may be represented by feature vectors. A feature vector may be an n-dimensional vector of numerical features that represent some object. In the example of FIG. 4, each message within chat corpora 106 may be represented by a feature vector that comprises one or more contextual signals derived from the content of the particular message (e.g., words, phrases, inferred topics, and the like) as well as contextual signals associated with the message as included in context 108.

The feature vector for a particular message may be represented as a set of (ID, weight) pairs. The ID may represent a unique identifier for a particular signal (e.g., a specific phrase such as "how are you") associated with the message. The weight may represent the frequency or some other suitable weight associated with the particular signal.

System 100 may define one or more transform functions F(x) 102 to project instances of training data 104 as input to a different space $\Omega_F$ to perform machine learning using learning module 110 in space $\Omega_F$. The RPM architecture may leverage an efficient randomized projection method using a modified version of locality sensitive hashing (LSH) to define one or more transform functions F(x) 102. Specifically, system 100 may apply the one or more transform functions F(x) 102 to perform random projection of training data 104 into space $\Omega_F$. In some examples, system 100 may perform machine learning to determine the optimal set of one or more transform functions F(x) 102 to optimize its projection of training data 104.

Random projection methods may typically be used to cluster documents or other types of data to efficiently compute similarity between data points that have high dimensionality. With respect to the techniques disclosed herein, the feature vectors that represent messages may exhibit relatively high dimensionality because of the large word vocabularies typically used in natural language text or informal chat language). The techniques disclosed herein performs multiple random projections using the one or more transform functions F(x) 102. System 100 may perform random projection using the one or more transform functions F(x) 102 to efficiently transform the input data "x" (e.g., high-dimensional feature vector corresponding to an incoming chat message) into a low-dimensional representation. System 100 may further augment the projected representation along with original message "x" paired with observed responses (seed examples from training data 104, which is shown in FIG. 4 as seed examples 112) and perform joint learning over this augmented space to train a machine-trained model (e.g., response suggestion model 56).

As discussed above, the RPM architecture may leverage an efficient randomized projection method using a modified version of locality sensitive hashing (LSH) to define the one or more transform functions F(x) 102. The RPM architecture may utilize a random projection method based on LSH that can be efficiently computed on-the-fly during training (e.g., by system 100 or elsewhere on the cloud) and during inference time (e.g., when utilizing response suggestion model 56 on device 2). Computing the functions on the fly may in some instances be important for on-device inference (e.g., executing response suggestion model 56 on computing device 2) because a phone or smart watch (e.g., computing device 2) may have memory constraints that due to the memory constraints on the device, it may not be possible for system 100 to pre-compute the random vectors (that can be very large for high dimensional data) that may be required for performing the one or more transform functions F(x) 102's projections and to store the pre-computed random vectors into memory (e.g., onto storage devices 50) on computing device 2.

System 100 may perform one or more transform functions F(x) 102 to project and convert each message within training data 104 (e.g., a feature vector) into a hash signature represented as a binary (i.e., having values of 1 and 0) bit vector having a set number of bits. In this way, system 100 transforms input having relatively high dimensionality into a low-dimensional representation of a bit vector having a fixed number of bits. For example, system 100 may hash each message into a bit vector having the same number of bits (e.g., 8 bits), so that the message "how are you?" can be represented with the hash signature 01001010 after projection. In practice, system 100 may apply multiple projections on a single message feature vector, so that each message feature vector "x" is represented with multiple hash signatures, all of which may be added to and linked to message feature vector "x" in learning module 110 during training.

As such, the techniques disclosed herein may enable efficient on-the-fly computation of the random projection method, thereby enabling a mobile computing device to compute the random vector, thereby obviating the need for the mobile computing device to store pre-computed random vectors. Thus, the techniques disclosed herein may enable a mobile computing device to execute an on-device machine-trained model to infer candidate responses for a received communication without the need to use an off-device model.

System 100 may execute learning module 110 to perform training over training data 104 having reduced dimensionality of features as transformed by one or more transform functions F(x) 102 in space $\Omega_F$ to construct response suggestion model 56 that can score responses to a message (e.g., a received communication) and find a specified number of highest scoring responses.

In one example, system 100 may perform semi-supervised machine learning over training data 104 by utilize a graph-based modeling framework and performing label propagation over nodes of a graph to train model weights $\theta_F$ to generate response suggestion model 56. In performing machine learning over training data 104, system 100 may construct graph 114 in which data is represented by nodes and labels applied to the nodes, and where related nodes are linked by edges. The edges may have associated edge weights that are defined by a similarity function on the linked nodes and indicate how strongly the labels of the connected nodes should agree. System 100 may perform label propagation over the nodes of graph 114 by using class label information associated with each labeled seed node and iteratively propagating these labels over the graph. Such a technique for machine learning may, in some instances, be referred to as an Expander graph-based machine learning framework.

In graph 114, message nodes associated with incoming messages "x" may be connected via edges to response nodes associated with responses to the messages. Further, graph 114 may also include projected nodes that represent the projected hash signatures F(x) for a message and may link these projected nodes via edges to the message node associated with the corresponding message "x." System 100 may derive the semantic intent of the responses associated with the response nodes based at least in part on extracting lexical features from the responses, label the responses with the corresponding semantic intent, and may perform label propagation to iteratively propagate relevant semantic intent along with actual responses through graph 114 to message nodes and hash response nodes to learn a ranked list of predicted responses and corresponding weights (e.g., confidence scores) for each projected node that represents a respective projected hash signature. In this way, learning module 110 may associate messages with responses and corresponding weights, where the weight may indicate the relevance of the associated response to the particular message.

Further, by deriving the semantic intent of the responses associated with the response nodes, system 100 may determine cluster responses having the same semantic intent into semantic clusters. For example, each response that belongs to the same semantic cluster may be labeled with the same label indicating their membership in the semantic cluster.

Because graph 114 connects message nodes with projected nodes associated with hash signatures of messages, each of the projected nodes in graph 114 may be labeled with the same ranked list of predicted responses and weights as a corresponding message node. This may enable system 100 to generate a relatively lightweight response suggestion model 56 that may include a set of projected nodes labeled with responses and corresponding weights, as well as semantic cluster labels that indicate the one or more semantic clusters to which each response belongs to, which may be suitable for mobile computing devices such as mobile phones and smart watches.

In addition, system 100 may apply additional normalization techniques over responses that are learned for projected nodes to down-weight frequently occurring responses (e.g., "thanks"). The projected hash signatures (e.g., bit vectors in low-dimensional representation) along with the response labels and weights together form response suggestion model 56 that computing device 2 may utilize to infer candidate responses for a received communication.

Figure 5:
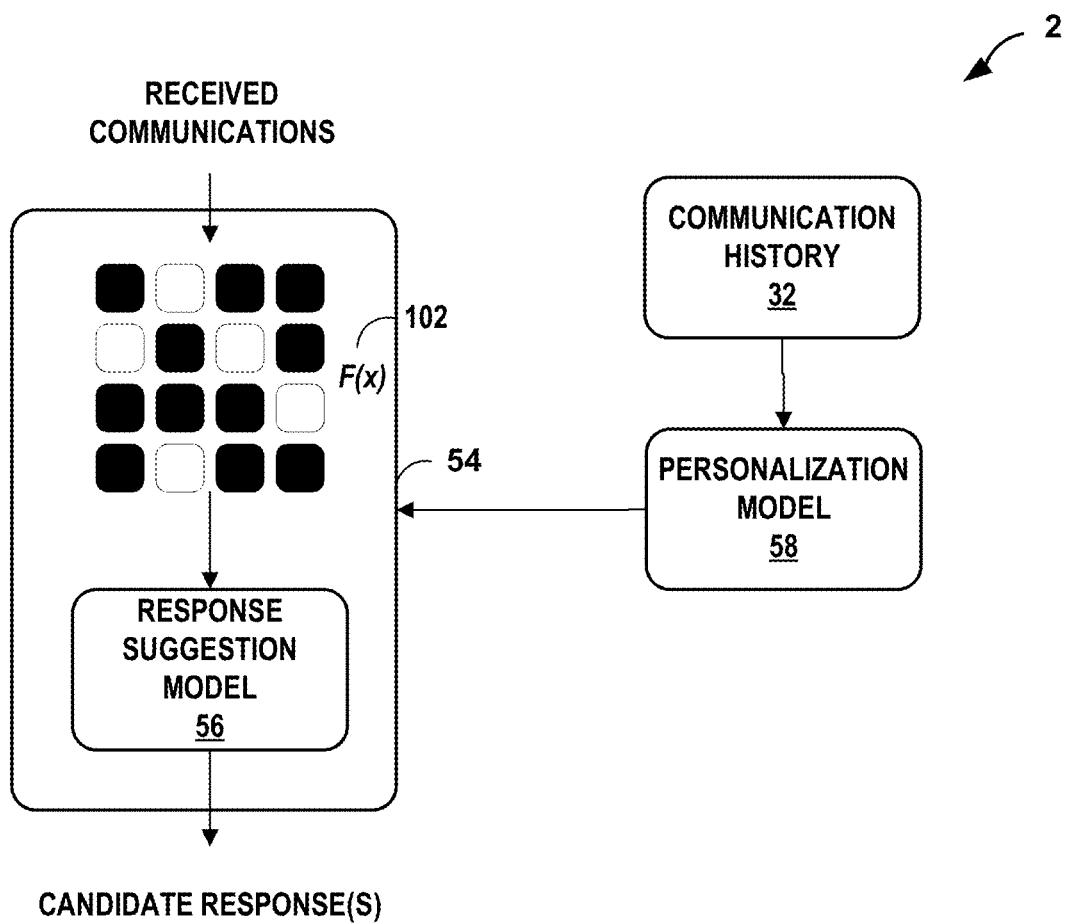
FIG. 5 is a block diagram illustrating example techniques for generating candidate responses for a received communication using an on-device machine-trained model, in accordance with one or more techniques of the present disclosure.

FIG. 5 is a block diagram illustrating example techniques generating candidate responses for a received communication using an on-device machine-trained model, in accordance with one or more techniques of the present disclosure. As shown in FIG. 5, response suggestion module 54 executing on computing device 2 may include response suggestion model 56 that is machine trained according to the techniques described with respect to FIG. 4.

Computing device 2 may receive and install response suggestion module 54. Response suggestion module 54, as installed on computing device 2 may be a set of hash signatures (e.g., bit vectors), a set of projected nodes associated with the hash signatures, a set of response labels that indicate a ranked list of predicted responses associated with each of the projected nodes, weights associated with each of the predicted responses that indicates the relevancy of a predicted response to a projected node, and semantic cluster labels associated with the set of predicted responses that indicate the one or more semantic clusters to which each predicted response belongs. The hash signatures, response labels, weights, and indications of semantic cluster labels may be stored as structure or unstructured data, such as database tables, comma separated values, Extensible Markup Language (XML) files, lookup tables, and the like.

When computing device 2 receives a communication, computing device 2 may utilize response suggestion module 54 to generate one or more candidate responses to the received communication. In response to receiving a communication for which computing device 2 may generate a response, response suggestion module 54 may project the received communication on-the-fly into a hash signature (e.g., bit vectors in low-dimensional representation) using the same one or more transform functions F(x) 102 used during training time of response suggestion model 56. Computing device 2 may aggregate and sort the responses and weights of the responses that correspond to the projected node associated with the hash signature to produce a ranked list of predicted responses for the received communication that correlates with the associated weights of the predicted responses. For example, computing device 2 may designate the most heavily weighed predicted responses (e.g., the top 3 responses with the largest corresponding weights) as the candidate responses to the received communications that computing device 2 may provide to the user for selection.

In some examples, response suggestion model 56 may also surface additional candidate responses based at least in part on the semantic meaning of a candidate response. For example, if "Yes, that works!" is included in an example ranked list of predicted responses, response suggestion model 56 may also determine and suggest other related, but diverse responses, such as "Sounds good," that share the same or similar semantic meaning, based on semantic intents inferred for the predicted response. Response suggestion model 56 may infer such semantic intents based at least in part on the semantic cluster labels associated with the responses, so that response suggestion model 56 may determine that responses are semantically related if they each have the same semantic cluster label.

In some examples, computing device 2 may utilize a diversity-based ranking to avoid repeating responses that belong to the same semantic cluster. For example, predicted responses "Thanks!" and "Thank you" may both belong to the same thanks semantic cluster. In this case, if both "Thanks!" and "Thank you" are included in the set of highest ranked predicted responses, which may be determined based at least in part on the weight associated with the responses, computing device 2 may penalize the score of one of the two responses so that only one of the two predicted responses is included in the set of candidate responses computing device 2 provides to the user for selection.

More formally, for a received conversation, computing device 2 may generate response candidate predictions $R_{predicted}$ (i.e., predicted responses) according to within response suggestion module 54 as discussed above, rank the response suggestions $r_i \in R_{predicted}$ in decreasing order based on prediction scores $\theta_i$, and filter out the response suggestions where $\theta_i$ is less than the model threshold $\theta_{threshold}$. For the remaining candidate responses predicted using response suggestion module 54, computing device 2 may apply the diversity-based ranking discussed above to filter out candidate responses based on semantic clustering of ranked responses Cluster ($r_i$), so that only a single predicted response from a particular semantic cluster is included in the set of candidate responses that are presented to the user.

Thus, response suggestion module 54 may randomly project, using one or more transform functions F(x) 102, the received communication on-the-fly into a hash signature. Response suggestion module 54 may determine the projected node associated with the hash signature and determine the set of predicted responses associated with the projected node. For the set of predicted responses associated with the projected node, response suggestion module 54 may filter out responses having associated weights that are below a threshold. For the remaining responses, response suggestion module 54 may apply the diversity-based rankings. For example, response suggestion module 54 may determine, based on the semantic cluster labels associated with the remaining predicted responses, whether two or more of the predicted responses have the same semantic cluster label and thus are in the same semantic cluster. If so, response suggestion module 54 may rank those predicted responses based on their associated weights, and penalize the lower-ranking predicted response(s), so that only a single predicted response in the semantic cluster is included in the set of candidate responses that are presented to the user.

In some examples, computing device 2 may include default candidate response suggestions in the set of candidate responses that are provided to the user for selection. Computing device 2 may create a set of default candidate responses $R_{default}$ by selecting responses from popular semantic clusters based on frequency in chat data. Computing device 2 may calculate a prediction score for each candidate responses within the set of default candidate responses $R_{default}$ as score=$\lambda_{backoff}$*(Rank$_{max}$−Rank$_{current}$), where $\lambda_{backoff}$ may be a default value (e.g., $1e^{-6}$), Rank$_{max}$ may be set to a value (e.g., 3) depending on how many candidate responses computing device 2 presents to the user, and Rank$_{current}$ may be the ranking of the particular candidate response within the set of default candidate responses. The scores of the candidate responses within the set of default candidate responses $R_{default}$ may be compared with the scores of response candidate predictions $R_{predicted}$, and one or more default candidate responses may be included in the set of candidate responses presented to the user based at least in part on their scores relative to that of the set of candidate responses.

In some examples, computing device 2 may utilize a related cluster model to include candidate responses from sematic clusters that are related to the sematic clusters of the top response candidates within the set of response candidate predictions $R_{predicted}$ generated according to within response suggestion module 54. Two semantic clusters may be related if a predicted response belongs to both semantic clusters.

For example, computing device 2 may select the top candidate response $r_i \in R_{predicted}$ and may perform a lookup of the semantic cluster $C_i$ of response $r_i$. Such semantic cluster assignments may be learned and generated by system 100 when generating response suggestion module 54. Computing device 2 may sample related clusters $C_j \in$ Related Cluster($C_i$) from hierarchical associations $C_j \leftrightarrow C_i$. Computing device 2 may sample responses $r_j \in C_j$, generate a score for each of these responses as score($r_j$)$\propto W_{cj} \leftrightarrow _{ci}$, and rank the responses $r_j$ with the set of response candidate predictions $r_i \in R_{predicted}$.

In some examples, computing device 2 may perform further processing and/or filtering of the candidate responses generated from response suggestion module 54. For example, computing device 2 may filter bad response suggestions, such as responses with trailing or malformed punctuations, from the candidate responses.

In some examples, due to the processing and memory constraints of computing device 2, computing device 2 may load only a portion (e.g., less than all) of response suggestion model 56 to generate candidate responses to a received communication. For example, computing device 2 may load or page into memory restricted portions (e.g., less than the entirety) of response suggestion model 56 based on frequent access patterns or based at least in part on the received communication for which response suggestion model 56 may infer one or more candidate responses. Thus, computing device 2 may be able to load relatively small chunks of response suggestion model 56 (e.g., in 4 kilobyte chunks) instead of loading the complete response suggestion model 56 into memory. In various examples, because response suggestion model 56 is a read-only model, the model may be easily paged out of memory. Thus, response suggestion model 56 being a read-only model may provide a potential technical advantage of being able to be used in devices (e.g., computing device 2) having a limited amount of memory.

In some examples, the techniques discussed herein may further be extended, so that such techniques for machine learning and training of models may be perform on the mobile device (e.g., computing device 2) for a variety of uses, such as personalizing candidate responses and suggested candidate responses based on user preference with respect to the responses' tone, style, formality, and the like. In accordance with some aspects of the present disclosure, response suggestion module 54 may personalize the candidate responses that are presented to the user by generating personalized candidate responses and including such personalized candidate responses in the candidate responses that are presented to the user.

Response suggestion module 54 may personalize candidate responses for the user of computing device 2 to which the received communication is intended. To personalize candidate responses, response suggestion module 54 may generate personalized candidate responses that more closely match the user's writing style, tone, formality, use of words and phrases, punctuation style, and the like. Response suggestion module 54 may include such personalized candidate responses in the set of candidate responses presented to the user.

Response suggestion module 54 may generate personalized candidate responses based at least in part on the communication history 32 of the user of computing device 2 to which the received communications was intended. Communication history 32 of the user may include messages received by the user and previous responses sent by the user. Such received messages and sent response may include text messages, SMS messages, e-mails, social media posts, and the like that were previously sent and/or received by the user. Response suggestion module 54 may generate such personalized candidate responses based at least in part on the communication history 32 of the user of computing device 2 only after being explicitly granted access by the user to access communication history 32 of the user, and the user may be able to revoke access to communication history 32 at any time.

Communication history 32 may be stored in computing device 2 or may be stored in an external computing device. For example, if computing device 2 is a wearable device, such as a smartwatch that is paired with a smartphone, communication history 32 may be stored in the smartphone.

In these examples, computing device 2 may store a subset of communication history 32, such as indications of the 100 most recent responses sent by the user, indications of the candidate responses previously selected by the user, and the like. Thus, in some examples, to generate personalized candidate responses, computing device 2 may communicate with an external computing device to access communication history 32 stored therein.

In some examples, response suggestion module 54 may be able to generate personalized candidate responses in conjunction with the techniques disclosed herein for generating candidate responses. In other words, response suggestion module 54 may project the received communication on-the-fly into a hash signature using transform function(s) F(x) 102. Response suggestion module 54 may determine a projected node in response suggestion model 56 associated with the hash signature, as well as a ranked set of predicted responses associated with the projected node. Response suggestion module 54 may generate one or more personalized candidate responses based at least in part on the ranked set of predicted responses associated with the projected node, and may include the one or more personalized candidate responses in the set of candidate responses that are presented to the user.

In other examples, response suggestion module 54 may be able to generate personalized candidate responses without also performing the techniques disclosed herein for generating candidate responses. In this example, response suggestion module 54 may determine a set of predicted responses for responding to a received communication via any suitable technique, with or without the use of response suggestion model 56. For example, response suggestion module 54 may utilize a model that does send the received communication off computing device 2 to determine the set of predicted responses. Response suggestion module 54 may generate one or more personalized candidate responses based at least in part on the set of predicted responses for responding to the received communication, and may include one or more personalized candidate responses in the set of candidate responses that are presented to the user.

Response suggestion module 54 may generate one or more personalized response messages based on communication history 32 via use of personalization model 58. Personalization model 58 may determine the semantic cluster to which each previously sent response by the user as stored in communication history 32 belongs, and may store an indication of such previously sent response-semantic cluster associations. Thus, personalization model 58 may be a map of previously sent responses with semantic clusters. Personalization model 58 may therefore receive an indication of a semantic cluster and may, in response, output indications of one or more previously sent response by the user that belong to the indicated semantic cluster. In some examples, personalization model 58 may determine the semantic cluster to which a subset (fewer than all) sent response by the user as stored in communication history 32 belongs, such as the one thousand most recently sent responses.

Personalization model 58 may determine the semantic cluster to which a previously sent response belongs in any suitable way. In one example, because response suggestion model 56 contains a plurality of responses that each belong to a semantic model, if the previously sent response matches a response in response suggestion model 56, then the previously sent response may be associated with the same semantic cluster as the semantic cluster to which a response in response suggestion model 56 belongs.

Alternatively, personalization model 58 may derive the semantic intent of previously sent responses by the user as store in communication history 32 to determine semantic clusters to which the previously sent responses belong. Personalization model 58 may determine such semantic intent by extracting lexical features from the previously sent responses or via any suitable technique.

In another example, personalization model 58 may determine mappings of previously sent responses to semantic clusters via a machine trained model that predicts semantic clusters from hash signatures.

In another example, personalization model 58 may determine mappings of previously sent responses to semantic clusters by calculating a similarity based on hash signatures.

To generate one or more personalized response messages, response suggestion module 54 may select one or more responses stored in communication history 32 that were previously sent by the user as the one or more personalized response messages. Response suggestion module 54 may make the selection of the one or more previous responses stored in communication history 32 based at least in part on the semantic clusters to which the set of predicted responses for predicting the received communication belongs, as well as the semantic clusters to which the one or more previously sent responses belong.

For each semantic cluster of the one or more semantic clusters to which the set of predicted responses belong, response suggestion module 54 may send an indication of the respective semantic cluster to personalization model 58 and may, in response, receive from personalization model 58 an indication of one or more previous responses sent by the user that belongs to the semantic cluster. Response suggestion module 54 may include the one or more previous responses sent by the user in the one or more personalized candidate responses.

In some examples, response suggestion module 54 may include a previous response sent by the user as a personalized candidate response only if the previous response matches one of the responses in the response space of response suggestion model 56 that belongs to the semantic cluster. The response space of response suggestion model 56 may include all the predicted responses in response suggestion model 56 that are associated with one or more of the projected nodes. For example, responses in the response space of response suggestion model 56 that belongs to a partings semantic cluster may include the responses "goodbye," "see you later," and "adios," because they are each a predicted response in one or more of the ranked list of predicted responses associated with one or more projected nodes in response suggestion model 56.

For example, for a predicted response of "goodbye" that belongs to a partings semantic cluster that includes the responses "goodbye," "see you later," and "adios" in the response space of response suggestion model 56, response suggestion module 54 may determine, using personalization model 58, whether a previous response sent by the user matches one of the responses "goodbye," "see you later," and "adios" in the response space of response suggestion model 56 that belongs to the partings semantic cluster.

A response may match another response if they include the same words and/or phrases, if they include the same set of emojis, if they include the same image, and the like. If response suggestion module 54 determines, using personalization model 58, that a previous response sent by the user belongs to the same partings semantic cluster, and that the previous response matches one of the responses in the response space of response suggestion model 56 that belongs to the partings semantic cluster, then response suggestion module 54 may include that previously sent response in the semantic cluster as a personalized candidate response. For example, if the user previously sent a response message of "see you later," then response suggestion module 54 may include the message "see you later" as a personalized candidate response.

In some examples, response suggestion module 54 may include a previous response sent by the user as a personalized candidate response if the previous response belongs to the same semantic cluster as a predicted response in the ranked list of predicted responses associated with the projected node. Such a previous response may be included as a personalized candidate response regardless of whether the previous response matches one of the responses in the response space of response suggestion model 56 that belongs to the semantic cluster.

For example, for a predicted response of "goodbye" that belongs to a partings semantic cluster that includes the responses "goodbye," "see you later," and "adios" in the response space of response suggestion model 56, response suggestion module 54 may determine, using personalization model 58, whether a previous response sent by the user also belongs to the partings semantic cluster. If response suggestion module 54 determines, using personalization model 58, that a previous response of "see ya!" belongs to the partings semantic cluster, then response suggestion module 54 may include the message "see ya!" as a personalized candidate response, even though the message "see ya!" does not match any of "goodbye," "see you later," and "adios."

In some examples, more than one previous response sent by the user may map to the same semantic cluster. In this case, personalization model 58 may return only a single previous response that maps to the semantic cluster. For example, personalization model 58 may return the most frequently sent previous response out of the previous responses that map to the same semantic cluster. Alternatively, personalization model 58 may return the most recently sent previous response out of the previous responses that map to the same semantic cluster. Personalization model 58 may also use any other suitable alternative techniques or criteria to select a previous response out of a plurality of previous responses that map to the same semantic cluster.

Including a previously sent response as a personalized candidate response may include adding the previously sent response into the ranked list of predicted responses for the received communication. For example, if the user previously sent a response message of "see you later," response suggestion module 54 may include the message "see you later" in the ranked list of predicted responses. In some examples, the previously sent response may replace other predicted responses in the ranked list of predicted responses that belong to the same semantic cluster as the previously sent response. Thus, the response message of "see you later" may replace the response message "goodbye" that was previously included in the ranked list of predicted responses if response suggestion module 54 determines to include only one response from a semantic cluster in the ranked list of predicted responses.

Response suggestion module 54 may assign a relatively high weight or rank to the previously sent response to increase the probability that the previously sent response is included as one of the one or more candidate responses that are presented to the user. In some examples, response suggestion module 54 may always ensure that the previously sent response that is added to the ranked list of predicted responses is included in the one or more candidate responses that are presented to the user. In this way, response suggestion module 54 may include one or more personalized candidate responses in the one or more candidate responses that are presented to the user.

Figure 6:
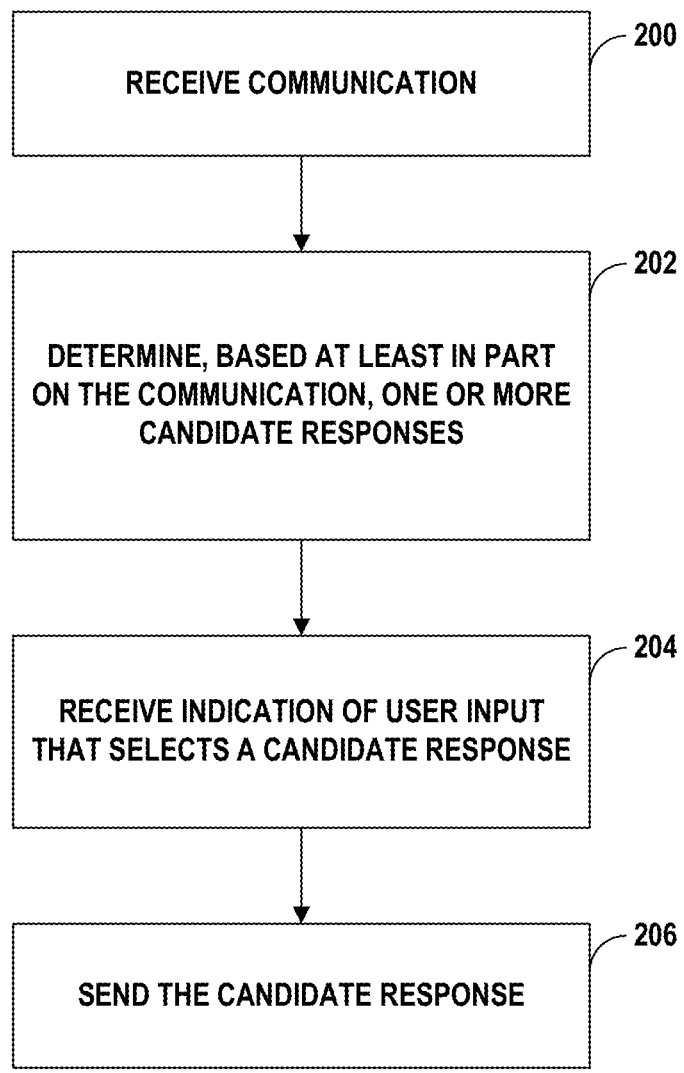
FIG. 6 is a flow diagram illustrating example operations of a computing device for utilizing an on-device machine-trained model to generate candidate responses responsive to a received communication, in accordance with one or more techniques of the present disclosure.

FIG. 6 is a flow diagram illustrating example operations of a computing device for utilizing an on-device machine-trained model to generate candidate responses responsive to a received communication, in accordance with one or more techniques of the present disclosure. For purposes of illustration only, the example operations of FIG. 6 are described below within the context of FIGS. 1-5.

In the example of FIG. 6, at least one processor of computing device 2 may receive (200) a communication sent from an external computing device. The at least one processor may use an on-device machine-trained model 56 executing on computing device 2 to determine (202) one or more candidate responses to the received communication, based at least in part on the communication. The at least one processor may receive (204) an indication of user input that selects a candidate response from the one or more candidate responses. Responsive to receiving the indication of user input that selects the candidate response, the at least one processor may send (206) the candidate response to the external computing device from which the communication was sent.

In some examples, the on-device machine-trained model 56 comprises indications of a plurality of projected nodes, wherein each of the plurality of projected nodes are associated with a ranked list of predicted responses. In some examples, determining, using the on-device machine-trained model 56 and based at least in part on the communication, the one or more candidate responses to the communication further comprises: projecting, by the at least one processor using a random projection function 102, the received communication on-the-fly into a hash signature, determining, by the at least one processor, a projected node that is associated with the hash signature from the plurality of projected nodes, and determining, by the at least one processor, the one or more candidate responses to the communication from the ranked list of predicted responses. In some examples, the on-device machine trained model 56 is trained via semi-supervised machine learning at an external computing system 100 to associate the plurality of projected nodes with respective ranked lists of predicted responses.

In some examples, the at least one processor may determine one or more personalized candidate responses based at least in part on a communication history 32 of a user of the computing device, wherein the user is an intended recipient of the communication, and may include the one or more personalized candidate responses in the one or more candidate responses. In some examples, determining the one or more personalized candidate responses may further include the at least one processor determining, using the on-device machine-trained model 56 and based at least in part on the communication, a ranked list of predicted responses to the communication, wherein the one or more candidate responses are selected from the ranked list of responses, and in response to determining that the communication history 32 of the user includes a previous response sent by the user that belongs to a same semantic cluster as a predicted response, the at least one processor may include the previous response sent by the user in the one or more personalized candidate responses. In some examples, including the previous response sent by the user in the one or more personalized candidate responses is further in response to the at least one processor determining that the previous response matches one of a plurality of predicted responses in a response space of the on-device machine-trained model 56 that belongs to the semantic cluster.

The following numbered examples may illustrate one or more aspects of the present disclosure.

Example 1

A method comprising: receiving, by at least one processor of a computing device, a communication sent from an external computing device; determining, by the at least one processor using an on-device machine-trained model and based at least in part on the communication, one or more candidate responses to the communication; receiving, by the at least one processor, an indication of a user input that selects a candidate response from the one or more candidate responses; and responsive to receiving the indication of the user input that selects the candidate response, sending, by the at least one processor, the candidate response to the external computing device.

Example 2

The method of Example 1, wherein: the on-device machine-trained model comprises indications of a plurality of projected nodes, wherein each of the plurality of projected nodes are associated with a ranked list of predicted responses.

Example 3

The method of Example 2, wherein determining, using the on-device machine-trained model and based at least in part on the communication, the one or more candidate responses to the communication further comprises: projecting, by the at least one processor using a random projection function, the received communication on-the-fly into a hash signature; determining, by the at least one processor, a projected node that is associated with the hash signature from the plurality of projected nodes; and determining, by the at least one processor, the one or more candidate responses to the communication from the ranked list of predicted responses.

Example 4

The method of any of Examples 1-3, wherein the on-device machine trained model is trained via semi-supervised machine learning at an external computing system to associate the plurality of projected nodes with respective ranked lists of predicted responses.

Example 5

The method of any of Examples 1-4, further comprising: determining, by the at least one processor, one or more personalized candidate responses based at least in part on a communication history of a user of the computing device, wherein the user is an intended recipient of the communication; and including, by the at least one processor, the one or more personalized candidate responses in the one or more candidate responses.

Example 6

The method of Example 5, wherein determining the one or more personalized candidate responses further comprises: determining, by the at least one processor using the on-device machine-trained model and based at least in part on the communication, a ranked list of predicted responses to the communication, wherein the one or more candidate responses are selected from the ranked list of responses; and in response to determining that the communication history of the user includes a previous response sent by the user that belongs to a same semantic cluster as a predicted response, including, by the at least one processor, the previous response sent by the user in the one or more personalized candidate responses.

Example 7

The method of Example 6, wherein including the previous response sent by the user in the one or more personalized candidate responses is further in response to determining that the previous response matches one of a plurality of predicted responses in a response space of the on-device machine-trained model that belongs to the semantic cluster.

Example 8

A computing device comprising: a memory configured to store an on-device machine-trained model; at least one processor operably coupled to the memory and configured to: receive a communication sent from an external computing device; determine, using the on-device machine-trained model and based at least in part on the communication, one or more candidate responses to the communication; receive an indication of a user input that selects a candidate response from the one or more candidate responses; and responsive to receiving the indication of the user input that selects the candidate response, send the candidate response to the external computing device.

Example 9

The computing device of Example 8, wherein: the on-device machine-trained model comprises indications of a plurality of projected nodes, wherein each of the plurality of projected nodes are associated with a ranked list of predicted responses.

Example 10

The computing device of Example 9, wherein the at least one processor is further configured to: project, using a random projection function, the received communication on-the-fly into a hash signature; determine a projected node that is associated with the hash signature from the plurality of projected nodes; and determine the one or more candidate responses to the communication from the ranked list of predicted responses.

Example 11

The computing device of any of Examples 8-10, wherein the on-device machine trained model is trained via semi-supervised machine learning at an external computing system to associate the plurality of projected nodes with respective ranked lists of predicted responses.

Example 12

The computing device of any of Examples 8-11, wherein the at least one processor is further configured to: determine one or more personalized candidate responses based at least in part on a communication history of a user of the computing device, wherein the user is an intended recipient of the communication; and include the one or more personalized candidate responses in the one or more candidate responses.

Example 13

The computing device of Example 12, wherein the at least one processor is further configured to: determine, using the on-device machine-trained model and based at least in part on the communication, a ranked list of predicted responses to the communication, wherein the one or more candidate responses are selected from the ranked list of responses; and in response to determining that the communication history of the user includes a previous response sent by the user that belongs to a same semantic cluster as a predicted response, include the previous response sent by the user in the one or more personalized candidate responses.

Example 14

The computing device of Example 13, wherein the at least one processor is further configured to: include the previous response sent by the user in the one or more personalized candidate responses further in response to determining that the previous response matches one of a plurality of predicted responses in a response space of the on-device machine-trained model that belongs to the semantic cluster.

Example 15

A computer-readable storage medium encoded with instructions that, when executed, cause at least one processor of a computing device to: receive a communication sent from an external computing device; determine, using an on-device machine-trained model and based at least in part on the communication, one or more candidate responses to the communication; receive an indication of a user input that selects a candidate response from the one or more candidate responses; and responsive to receiving the indication of the user input that selects the candidate response, send the candidate response to the external computing device.

Example 16

The computer-readable storage medium of Example 15, wherein: the on-device machine-trained model comprises indications of a plurality of projected nodes, wherein each of the plurality of projected nodes are associated with a ranked list of predicted responses.

Example 17

The computer-readable storage medium of Example 16, wherein the instructions, when executed, further cause the at least one processor of the computing device to: project, using a random projection function, the received communication on-the-fly into a hash signature; determine a projected node that is associated with the hash signature from the plurality of projected nodes; and determine the one or more candidate responses to the communication from the ranked list of predicted responses.

Example 18

The computer-readable storage medium of any of Examples 15-17, wherein the on-device machine trained model is trained via semi-supervised machine learning at an external computing system to associate the plurality of projected nodes with respective ranked lists of predicted responses.

Example 19

The computer-readable storage medium of any of Examples 15-18, wherein the instructions, when executed, further cause the at least one processor of the computing device to: determine one or more personalized candidate responses based at least in part on a communication history of a user of the computing device, wherein the user is an intended recipient of the communication; and include the one or more personalized candidate responses in the one or more candidate responses.

Example 20

The computer-readable storage medium of Example 19, wherein the instructions, when executed, further cause the at least one processor of the computing device to: determine, using the on-device machine-trained model and based at least in part on the communication, a ranked list of predicted responses to the communication, wherein the one or more candidate responses are selected from the ranked list of responses; and in response to determining that the communication history of the user includes a previous response sent by the user that belongs to a same semantic cluster as a predicted response, include the previous response sent by the user in the one or more personalized candidate responses.

Example 21

A computing system comprising means for performing the method of any of Examples 1-7.

Example 22

A computer-readable storage medium storing instructions that, when executed by at least one processor, cause the at least one processor to perform the method of any of Examples 1-7.

Example 23

A method comprising: receiving, by at least one processor of a computing device, a communication sent from an external computing device; determining, by the at least one processor based at least in part on the communication, one or more candidate responses to the communication that includes one or more personalized candidate responses, including determining the one or more personalized candidate responses based at least in part on a communication history of a user of the computing device, wherein the user is an intended recipient of the communication; and receiving, by the at least one processor, an indication of a user input that selects a candidate response from the one or more candidate responses; and responsive to receiving the indication of the user input that selects the candidate response, sending, by the at least one processor, the candidate response to the external computing device.

Example 24

The method of Example 23, wherein determining the one or more personalized candidate responses further comprises:

determining, by the at least one processor and based at least in part on the communication, a ranked list of predicted responses to the communication, wherein the one or more candidate responses are selected from the ranked list of responses; and in response to determining that the communication history of the user includes a previous response sent by the user that belongs to a same semantic cluster as a predicted response, including, by the at least one processor, the previous response sent by the user in the one or more personalized candidate responses.

Example 25

The method of Example 24, wherein including the previous response sent by the user in the one or more personalized candidate responses is further in response to determining that the previous response matches one of a plurality of predicted responses in a response space that belongs to the semantic cluster.

Example 26

A computing system comprising means for performing the method of any of Examples 23-25.

Example 22

A computer-readable storage medium storing instructions that, when executed by at least one processor, cause the at least one processor to perform the method of any of Examples 23-25.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
  receiving, by at least one processor of a computing device, a communication sent from an external computing device;
  determining, by the at least one processor using an on-device machine-trained model, and based at least in part on the communication, one or more candidate responses to the communication, wherein the on-device machine-trained model comprises indications of a plurality of projected nodes, wherein each of the plurality of projected nodes are associated with a ranked list of predicted responses, and wherein determining the one or more candidate responses to the communication further comprises:
    projecting, by the at least one processor using a random projection function, the received communication into a hash signature;
    determining, by the at least one processor, a projected node that is associated with the hash signature from the plurality of projected nodes; and
    determining, by the at least one processor, the one or more candidate responses to the communication from the ranked list of predicted responses;
  receiving, by the at least one processor, an indication of a user input that selects a candidate response from the one or more candidate responses; and
  responsive to receiving the indication of the user input that selects the candidate response, sending, by the at least one processor, the candidate response to the external computing device.

2. The method of claim 1, wherein the on-device machine trained model is trained via semi-supervised machine learning at an external computing system to associate the plurality of projected nodes with respective ranked lists of predicted responses.

3. The method of claim 1, further comprising:
determining, by the at least one processor, one or more personalized candidate responses based at least in part on a communication history of a user of the computing device, wherein the user is an intended recipient of the communication; and
including, by the at least one processor, the one or more personalized candidate responses in the one or more candidate responses.

4. The method of claim 3, wherein determining the one or more personalized candidate responses further comprises:
determining, by the at least one processor using the on-device machine-trained model, and based at least in part on the communication, a ranked list of predicted responses to the communication, wherein the one or more candidate responses are selected from the ranked list of responses;
in response to determining that the communication history of the user includes a previous response sent by the user that belongs to a same semantic cluster as a predicted response, including, by the at least one processor, the previous response sent by the user in the one or more personalized candidate responses.

5. The method of claim 4, wherein including the previous response sent by the user in the one or more personalized candidate responses is further responsive to determining that the previous response matches one of a plurality of predicted responses in a response space of the on-device machine-trained model that belongs to the semantic cluster.

6. A computing device comprising:
a computer-readable storage medium configured to store an on-device machine-trained model;
at least one processor operably coupled to the computer-readable storage medium and configured to:
receive a communication sent from an external computing device;
determine, using the on-device machine-trained model and based at least in part on the communication, one or more candidate responses to the communication, wherein the on-device machine-trained model comprises indications of a plurality of projected nodes, wherein each of the plurality of projected nodes are associated with a ranked list of predicted responses, and wherein the processor is configured to determine the one or more candidate responses to the communication by at least being configured to:
project, using a random projection function, the received communication into a hash signature;
determine a projected node that is associated with the hash signature from the plurality of projected nodes; and
determine the one or more candidate responses to the communication from the ranked list of predicted responses;
receive an indication of a user input that selects a candidate response from the one or more candidate responses; and
responsive to receiving the indication of the user input that selects the candidate response, send the candidate response to the external computing device.

7. The computing device of claim 6, wherein the on-device machine trained model is trained via semi-supervised machine learning at an external computing system to associate the plurality of projected nodes with respective ranked lists of predicted responses.

8. The computing device of claim 6, wherein the at least one processor is further configured to:
determine one or more personalized candidate responses based at least in part on a communication history of a user of the computing device, wherein the user is an intended recipient of the communication; and
include the one or more personalized candidate responses in the one or more candidate responses.

9. The computing device of claim 8, wherein the at least one processor is further configured to:
determine, using the on-device machine-trained model and based at least in part on the communication, a ranked list of predicted responses to the communication, wherein the one or more candidate responses are selected from the ranked list of responses; and
in response to determining that the communication history of the user includes a previous response sent by the user that belongs to a same semantic cluster as a predicted response, include the previous response sent by the user in the one or more personalized candidate responses.

10. The computing device of claim 9, wherein the at least one processor is further configured to:
include the previous response sent by the user in the one or more personalized candidate responses further in response to determining that the previous response matches one of a plurality of predicted responses in a response space of the on-device machine-trained model that belongs to the semantic cluster.

11. A computer-readable storage medium encoded with instructions that, when executed, cause at least one processor of a computing device to:
receive a communication sent from an external computing device;
determine, using an on-device machine-trained model and based at least in part on the communication, one or more candidate responses to the communication, wherein the on-device machine-trained model comprises indications of a plurality of projected nodes, wherein each of the plurality of projected nodes are associated with a ranked list of predicted responses, and wherein the instructions cause the processor to determine the one or more candidate responses to the communication by at least causing the processor to:
project, using a random projection function, the received communication into a hash signature;
determine a projected node that is associated with the hash signature from the plurality of projected nodes; and
determine the one or more candidate responses to the communication from the ranked list of predicted responses;
receive an indication of a user input that selects a candidate response from the one or more candidate responses; and
responsive to receiving the indication of the user input that selects the candidate response, send the candidate response to the external computing device.

12. The computer-readable storage medium of claim 11, wherein the on-device machine trained model is trained via semi-supervised machine learning at an external computing system to associate the plurality of projected nodes with respective ranked lists of predicted responses.

13. The computer-readable storage medium of claim 11, wherein the instructions, when executed, further cause the at least one processor of the computing device to:
- determine one or more personalized candidate responses based at least in part on a communication history of a user of the computing device, wherein the user is an intended recipient of the communication; and
- include the one or more personalized candidate responses in the one or more candidate responses.

14. The computer-readable storage medium of claim 13, wherein the instructions, when executed, further cause the at least one processor of the computing device to:
- determine, using the on-device machine-trained model and based at least in part on the communication, a ranked list of predicted responses to the communication, wherein the one or more candidate responses are selected from the ranked list of responses; and
- in response to determining that the communication history of the user includes a previous response sent by the user that belongs to a same semantic cluster as a predicted response, include the previous response sent by the user in the one or more personalized candidate responses.

15. The computer-readable storage medium of claim 14, wherein the instructions, when executed, further cause the at least one processor of the computing device to:
- include the previous response sent by the user in the one or more personalized candidate responses further in response to determining that the previous response matches one of a plurality of predicted responses in a response space of the on-device machine-trained model that belongs to the semantic cluster.

* * * * *